(12) United States Patent
Haines

(10) Patent No.: US 12,508,094 B2
(45) Date of Patent: Dec. 30, 2025

(54) CURVED GIMBAL LINK GEOMETRY

(71) Applicant: Intuitive Surgical Operations, Inc., Sunnyvale, CA (US)

(72) Inventor: Timothy Haines, San Jose, CA (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 594 days.

(21) Appl. No.: 17/913,654

(22) PCT Filed: Mar. 24, 2021

(86) PCT No.: PCT/US2021/023959
§ 371 (c)(1),
(2) Date: Sep. 22, 2022

(87) PCT Pub. No.: WO2021/195264
PCT Pub. Date: Sep. 30, 2021

(65) Prior Publication Data
US 2023/0149109 A1 May 18, 2023

Related U.S. Application Data

(60) Provisional application No. 63/000,247, filed on Mar. 26, 2020.

(51) Int. Cl.
*A61B 34/00* (2016.01)
*B25J 13/02* (2006.01)
(Continued)

(52) U.S. Cl.
CPC .............. *A61B 34/74* (2016.02); *A61B 34/76* (2016.02); *B25J 13/025* (2013.01); *B25J 18/007* (2013.01); *A61B 34/35* (2016.02)

(58) Field of Classification Search
CPC ............................... A61B 34/76; B25J 13/025
See application file for complete search history.

(56) References Cited

U.S. PATENT DOCUMENTS

| 4,069,823 A | 1/1978 | Isakov et al. |
| 5,445,166 A | 8/1995 | Taylor et al. |

(Continued)

FOREIGN PATENT DOCUMENTS

| CA | 2709634 A1 | 7/2009 |
| CN | 203092570 U | 7/2013 |

(Continued)

OTHER PUBLICATIONS

International Search Report and Written Opinion for Application No. PCT/US2021/023959, mailed on Jun. 28, 2021, 16 pages.

(Continued)

*Primary Examiner* — Daniel D Yabut

(57) ABSTRACT

A control input assembly including a first link and a second link. A link housing extends from a second link first end portion to a second link second end portion. The second link first end portion is coupled to a first link second end portion via a joint shaft. An actuator is mounted within the link housing and the actuator defines an actuator axis. The actuator is configured to exert a torque on the joint shaft. The actuator axis and a rotational axis of the join shaft defines an offset angle, the offset angle being between about 20 degrees and 70 degrees.

19 Claims, 11 Drawing Sheets

(51) Int. Cl.
*B25J 18/00* (2006.01)
*A61B 34/35* (2016.01)

(56) References Cited

U.S. PATENT DOCUMENTS

| | | |
|---|---|---|
| 5,624,398 A | 4/1997 | Smith et al. |
| 5,625,576 A | 4/1997 | Massie et al. |
| 5,696,837 A | 12/1997 | Green |
| 5,784,542 A | 7/1998 | Ohm et al. |
| 5,807,377 A | 9/1998 | Madhani et al. |
| 5,876,325 A | 3/1999 | Mizuno et al. |
| 6,102,850 A | 8/2000 | Wang et al. |
| 6,197,017 B1 | 3/2001 | Brock et al. |
| 6,246,200 B1 | 6/2001 | Blumenkranz et al. |
| 6,309,397 B1 | 10/2001 | Julian et al. |
| 6,441,577 B2 | 8/2002 | Blumenkranz et al. |
| 6,459,926 B1 | 10/2002 | Nowlin et al. |
| 6,477,904 B2 | 11/2002 | Maeda et al. |
| 6,522,906 B1 | 2/2003 | Salisbury, Jr. et al. |
| 6,587,750 B2 | 7/2003 | Gerbi et al. |
| 6,594,552 B1 | 7/2003 | Nowlin et al. |
| 6,622,575 B1 | 9/2003 | Nagata |
| 6,671,581 B2 | 12/2003 | Niemeyer et al. |
| 6,684,129 B2 | 1/2004 | Salisbury et al. |
| 6,714,839 B2 | 3/2004 | Salisbury, Jr. et al. |
| 6,723,106 B1 | 4/2004 | Charles et al. |
| 6,817,974 B2 | 11/2004 | Cooper et al. |
| 6,837,883 B2 | 1/2005 | Moll et al. |
| 6,843,793 B2 | 1/2005 | Brock et al. |
| 6,949,106 B2 | 9/2005 | Brock et al. |
| 7,125,403 B2 | 10/2006 | Julian et al. |
| 7,373,219 B2 | 5/2008 | Nowlin et al. |
| D571,472 S | 6/2008 | Forlenza et al. |
| 8,002,767 B2 | 8/2011 | Sanchez et al. |
| 8,073,335 B2 | 12/2011 | Labonville et al. |
| 8,120,301 B2 | 2/2012 | Goldberg et al. |
| 8,220,765 B2 | 7/2012 | Bailey |
| 8,241,271 B2 | 8/2012 | Millman et al. |
| 8,271,130 B2 | 9/2012 | Hourtash et al. |
| 8,316,961 B2 | 11/2012 | Isobe et al. |
| 8,423,186 B2 | 4/2013 | Itkowitz et al. |
| 8,479,969 B2 | 7/2013 | Shelton, IV |
| 9,244,523 B2 | 1/2016 | Ogawa et al. |
| 9,244,524 B2 | 1/2016 | Inoue et al. |
| 9,291,793 B2 | 3/2016 | Cooper |
| 9,423,869 B2 | 8/2016 | Yanagihara |
| 9,632,577 B2 | 4/2017 | Ogawa et al. |
| 9,671,860 B2 | 6/2017 | Ogawa et al. |
| 9,770,305 B2 | 9/2017 | Farritor et al. |
| D849,953 S | 5/2019 | Lapaev |
| D896,390 S | 9/2020 | Scott |
| D897,537 S | 9/2020 | Hulford et al. |
| D965,145 S | 9/2022 | Milman et al. |
| D1,002,013 S | 10/2023 | Scott |
| 2003/0195664 A1 | 10/2003 | Nowlin et al. |
| 2004/0035243 A1 | 2/2004 | Duval |
| 2005/0187547 A1 | 8/2005 | Sugi |
| 2007/0005002 A1 | 1/2007 | Millman et al. |
| 2007/0032906 A1 | 2/2007 | Sutherland et al. |
| 2007/0043338 A1 | 2/2007 | Moll et al. |
| 2007/0156122 A1 | 7/2007 | Cooper |
| 2008/0125794 A1 | 5/2008 | Brock et al. |
| 2009/0088774 A1 | 4/2009 | Swarup et al. |
| 2010/0225209 A1 | 9/2010 | Goldberg et al. |
| 2010/0318099 A1 | 12/2010 | Itkowitz et al. |
| 2012/0165828 A1 | 6/2012 | Duque et al. |
| 2012/0192671 A1 | 8/2012 | Riwan et al. |
| 2013/0144395 A1 | 6/2013 | Stefanchik et al. |
| 2013/0325031 A1 | 12/2013 | Schena et al. |
| 2014/0005678 A1 | 1/2014 | Shelton, IV et al. |
| 2014/0005708 A1 | 1/2014 | Shelton, IV |
| 2016/0058443 A1 | 3/2016 | Yates et al. |
| 2018/0169867 A1 | 6/2018 | Yanagihara et al. |
| 2018/0193107 A1 | 7/2018 | Suh et al. |
| 2019/0328473 A1 | 10/2019 | Chassot et al. |
| 2019/0350662 A1* | 11/2019 | Huang .................. A61B 34/74 |
| 2020/0015917 A1 | 1/2020 | Cavalier et al. |
| 2021/0038336 A1* | 2/2021 | Ogata .................... A61B 34/76 |

FOREIGN PATENT DOCUMENTS

| | | | |
|---|---|---|---|
| CN | 107847284 A | 3/2018 | |
| CN | 308240506 | 9/2023 | |
| EM | 0086847400001 | 9/2021 | |
| EM | 0086847400002 | 9/2021 | |
| EP | 2548529 A1 | 1/2013 | |
| EP | 2783643 A1 | 10/2014 | |
| EP | 2990005 A1 | 3/2016 | |
| EP | 3364095 A1 | 8/2018 | |
| JP | 2014534080 A | 12/2014 | |
| JP | 2021023706 A | 2/2021 | |
| KR | 102480814 B1 * | 12/2022 | |
| WO | WO-2006037017 A2 | 4/2006 | |
| WO | WO-2006039092 A2 | 4/2006 | |
| WO | WO-2007143859 A1 | 12/2007 | |
| WO | WO-2010140016 A1 * | 12/2010 | .............. B25J 13/02 |
| WO | WO-2011039341 A1 * | 4/2011 | .............. B25J 13/02 |
| WO | WO-2011102629 A2 | 8/2011 | |
| WO | WO-2012127404 A2 | 9/2012 | |
| WO | WO-2017130562 A1 | 8/2017 | |
| WO | WO-2017136710 A2 | 8/2017 | |
| WO | WO-2017210501 A1 * | 12/2017 | ....... A61B 17/00234 |
| WO | WO-2019099504 A1 | 5/2019 | |

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.
"DaVinci Robotic Surgical System Si Overview," Jun. 5, 2015. Site visited Dec. 6, 2023, 1 Page, Retrieved from internet URL: https://www.youtube.com/watch?app=desktop&v=xJYXPxesaCs.
"How to Control a Robot! How a Da Vinci Robot is Controlled During Surgery," Jul. 15, 2021. Site visited Dec. 6, 2023 Retrieved from internet URL:https://www.youtube.com/watch?v=PBN54PNdr1U.
"New Technology Expands Use of Transoral Robotic Surgery (TORS)," U.S. Appl. No. 04/272,021. Site visited Dec. 6, 2023, 3 Pages, Retrieved from internet URL:https://oto.wustl.edu/new-technology-expands-use-of-transoral-robotic-surgery-tors.
Office Action for CN Application No. 2021800374188, mailed May 28, 2025, 37 pages.
Search Report for GB Application No. 2413137.7, mailed Sep. 30, 2024, 3 pages.

* cited by examiner

CURVED GIMBAL LINK GEOMETRY

CROSS-REFERENCE TO RELATED APPLICATIONS

This application is a U.S. national stage filing under 35 U.S.C. § 371 of International Application No. PCT/US2021/023959 (filed Mar. 24, 2021), entitled "Curved Gimbal Link Geometry," which claims priority to and the benefit of U.S. Provisional Patent Application No. 63/000,247, entitled "Curved Gimbal Link Geometry," filed Mar. 26, 2020, each of which is incorporated herein by reference in its entirety.

BACKGROUND

The embodiments described herein relate to control input devices, and more specifically to a master controller which may be used by a user to direct movements of a robot and in particular to direct movements of robotic surgical instruments or tools.

Controller mechanisms, e.g., control input devices, allow a user to control functions of various types of mechanisms, instruments, and tools. Teleoperated surgical devices that operate with at least partial computer assistance ("telesurgical systems"), for example, can use various types of medical instruments to perform minimally invasive surgical procedures that reduce damage to healthy tissue of patients. The medical instruments can be connected to slave devices such as slave arms that can be manipulated to perform the surgical procedures. Control of the medical instruments attached to a slave device can be provided to an operator at one or more master control devices, e.g., at a remote operator terminal or station, and/or using a hand control device. Actuators of the slave device can be controlled by the master control device to cause motion or initiate another function of a medical instrument, camera, or other end effector at the slave device that interacts with the patient operating site. In some examples, the master control device at the operator station can be physically manipulated by the operator in one or more degrees of freedom to control the end effector to be moved in coordination with the manipulation of the control device, e.g., to move in corresponding degrees of freedom at the operating site.

One of the degrees of freedom of a master control device can include a rotational degree of freedom of a handle of the master control device. For example, in some telesurgical systems, a master control device can include a handle attached to one or more gimbal links that are rotated by the operator via the handle to control a corresponding motion of an end effector in a three-dimensional space. Known systems use a gimbal assembly with multiple links to provide the desired degrees of freedom (DOFs) associated with the associated instrument and instrument end effector. For example, as the handle is moved by the operator, actuators within the one or more gimbal links detect a change in rotational (or translation) position, which can then be translated to initiate a corresponding change in position in the end effector. The actuators can also apply a torque or force to provide resistance feedback to the user consistent with the behavior at the end effector.

Because movement of the handle at the master control device is used to produce corresponding movement at the end effector, it is desirable that the movement of the handle via the gimbal assembly be smooth (i.e., not be subject to perceptibly high friction, perceptible irregularities in motion, or undesirable detents or other unpredicted haptic sensations). In addition, for effective control it is desirable that operation of the master control device handle appear weightless (i.e., gravity-free) to the operator. This apparent weightlessness keeps the handle stationary in space to prevent unwanted movement or unwanted haptic feedback to the operator. Therefore, as the operator moves each individual gimbal link in space, and as gravity exerts a changing force on each moving link, an associated changing torque must be applied to each gimbal link to compensate for the torque from gravity. But in addition, since the operator's gimbal link movement is dynamic and rapid, large gravity-compensating moments of inertia must be applied to maintain the handle's weightless sensation as the operator moves the gimbal links.

Techniques in the related art to counteract inertia associated with one or more gimbal links include employing actuators or other counterbalance mechanism to counteract mass observed and felt by the operator. Additionally, enhanced surgical devices (e.g., with heavier or larger end effectors) may require more powerful actuators in the master control device to ensure that the desired feedback force and torque produced in the master device accurately mimics the force torque which is present at the end effector. But, addition of more powerful motors in the gimbal assembly adds more mass to the gimbal links, which in turn increases each link's inertia that must be counteracted. Because of the dynamic nature of the master control device operation, and because of the increased weight and inertia of each gimbal link, the operator may struggle with fluidly moving the handle from one position to the next while also contending with the variable output of the actuators and/or counterbalance systems.

Thus, a need exists for an improved gimbal assembly of a master control input device to provide less restrictive and more fluid input control and haptic feedback output to the operator, and more specifically a need exists to effectively incorporate more powerful actuators for each gimbal link into a gimbal assembly of a master control input device for a telesurgical system.

SUMMARY

This summary introduces certain aspects of the embodiments described herein to provide a basic understanding. This summary is not an extensive overview of the inventive subject matter, and it is not intended to identify key or critical elements or to delineate the scope of the inventive subject matter.

In some embodiments, a control assembly includes an input handle, a first link, a second link, and an actuator. The input handle is rotatable about a first rotational axis and includes a handle input shaft. The first link includes a first link first end portion, a first link second end portion opposite the first link first end portion, and a joint shaft rotatable about a second rotational axis perpendicular to the first rotational axis and coupled to the first link second end portion. The first link first end portion is coupled to the input handle such that the handle input shaft extends within the first link. The second link includes a second link first end portion, a second link second end portion, and a second link housing. The second link housing extends from the second link first end portion to the second link second end portion. The actuator is mounted within the second link housing and is configured to exert a torque on the joint shaft of the first link about an actuator axis such that the actuator axis and the second rotational axis define an offset angle larger than 0 degrees and less than 90 degrees.

In some embodiments, the offset angle is between about 30 degrees and 60 degrees. In some embodiments, a gimbal center point is defined at an intersection of the first rotational axis and the second rotational axis. A gimbal radius is defined by a distance between the gimbal center point and the first end portion of the second link, and at least a portion of the second link housing is curved. A portion of the second link housing has a radius of curvature between about 0.5 to 1.5 times the gimbal radius. In some embodiments, a gimbal center point is defined at an intersection of the first rotational axis and the second rotational axis. A gimbal radius is defined by a distance between the gimbal center point and the first end portion of the second link. A gimbal envelope is defined as a spherical volume surrounding the gimbal center point and characterized by the gimbal radius, and the second link housing includes a curved portion within the gimbal envelope. In some embodiments, a gimbal center point is defined at an intersection of the first rotational axis and the second rotational axis. A gimbal radius is defined by a distance between the gimbal center point and the first end portion of the second link. The second link housing defines an offset gimbal surface extending at least partially along the actuator axis, and the offset gimbal surface intersects an arc defined by the gimbal radius.

In some embodiments, the actuator is a motor, and the motor includes a motor shaft extending along the actuator axis and operatively coupled the joint shaft. In some embodiments, the control input assembly includes an actuator transmission mounted within the second link housing. The actuator transmission includes one or more gears and the motor shaft is operatively coupled to the joint shaft via the one or more gears of the actuator transmission. In some embodiments, the one or more gears of the actuator transmission include a bevel gear and a spur gear, and the bevel gear and the spur gear are mounted to a gear shaft.

In some embodiments, a gimbal center point is defined at an intersection of the first rotational axis and the second rotational axis. A gimbal radius is defined by a distance between the gimbal center point and the first end portion of the second link. The actuator is a first actuator, the actuator axis is a first actuator axis, the joint shaft is a first joint shaft, and the offset angle is a first offset angle. The second link includes a second joint shaft rotatable about a third rotational axis and is coupled to the second link second end portion of the second link. The control input assembly further includes a third link and a second actuator. The third link includes a third link first end portion coupled to the second link second end portion via the second joint shaft of the second link, a third link second end portion opposite the third link first end portion, and a third link housing extending from the third link first end portion to the third link second end portion. The second actuator is mounted within the third link housing and coupled to exert a torque on the second joint shaft of the second link about a second actuator axis such that the second actuator axis and the third rotational axis of the second joint shaft define a second offset angle larger than 0 degrees and less than 90 degrees.

In some embodiments, the gimbal radius is a first gimbal radius and a second gimbal radius is defined by a distance between the gimbal center point and the third link first end portion. The second link housing includes a curved portion having a radius of curvature between about 0.5 to 1.5 times the first gimbal radius. The second link includes a curved portion having a radius of curvature between about 0.5 to 1.5 times the second gimbal radius.

In some embodiments, a control input assembly includes an input handle, a first link, a second link, and an actuator. The input handle includes a handle input shaft rotatable about a first rotational axis. The first link includes a first link first end portion, a first link second end portion opposite the first link first end portion, and a joint shaft. The first link first end portion is coupled to the input handle such that the handle input shaft extends within the first link. The first link second end portion is coupled to the joint shaft. The joint shaft defines a second rotational axis and the second rotational axis is perpendicular to the first rotational axis. An intersection of the first rotational axis and the second rotational axis defines a gimbal center point. The second link includes a first end portion, a second end portion, and a middle portion between the first end portion and second end portion. The second link first end portion is coupled to the first link second end portion via the joint shaft. A gimbal radius is defined between the gimbal center point and the second link first end portion. A gimbal envelop is defined as a spherical volume surrounding the gimbal center point characterized by the gimbal radius and the middle portion being curvilinear and entirely within the gimbal envelop. The actuator is mounted within the second link and operatively coupled to exert a torque on the joint shaft of the first link.

In some embodiments, the actuator is an electric motor, and the electric motor includes a motor shaft operatively coupled to the joint shaft of the first link. In some embodiments, the control input assembly further includes an actuator transmission mounted within the second link housing. The actuator transmission includes one or more gears, and the motor shaft is operatively coupled to the joint shaft of the first link via the one or more gears of the actuator transmission. In some embodiments, the one or more gears includes a driving gear and a driven gear. The driving gear includes a first number of gear teeth. The driven gear includes a second number of gear teeth and the second number of gear teeth is larger than the first number of gear teeth. In some embodiments, a gear ratio of the driven gear to the driving gear is between about 5:1 to 7:1. In some embodiments, the actuator transmission includes a transmission shaft. The one or more gears includes a first bevel gear, a second bevel gear, a spur gear, and an output gear. The motor shaft includes an end portion, and the first bevel gear is mounted to the end portion of the motor shaft. The first bevel gear is coupled to drive the second bevel gear. The second bevel gear and the spur gear are coupled to the transmission shaft such that the second bevel gear, the spur gear, and the transmission shaft rotate at a common rotational speed. The spur gear is coupled to drive the output gear, the output gear is coupled to the joint shaft such that the spur gear drives rotation of the join shaft.

In some embodiments, the actuator transmission includes a transmission shaft. The motor shaft of the electric motor is rotatable about an actuator axis. The transmission shaft is rotatable about a transmission axis. The transmission axis and the actuator axis define an offset angle between about 30 degrees and 60 degrees. In some embodiments, a radius of curvature of the second link middle portion is about 0.75 to 1.25 times the gimbal radius.

In some embodiments, a control input assembly includes an input handle, a first link, a second link, a third link, a first actuator, and a second actuator. The input handle includes a handle input shaft rotatable about a first rotational axis. The first link includes a first link first end portion, a first link second end portion, and a first joint shaft rotatable about a second rotational axis perpendicular to the first rotational axis. The first link first end portion is coupled to the input handle such that the handle input shaft extends within the first link. The first link second end portion is coupled to the first joint shaft. The second link includes a second link first end portion, a second link second end portion opposite the second link first end portion, and a second joint shaft, and a second link middle portion extending between the second link first end portion and the second link send end portion. The second link first end portion is coupled to the first link second end portion of via the first joint shaft. The second link middle portion extends in a first direction. The first direction including a component parallel to the first rotational axis and a component parallel to the second rotational axis. The first actuator is coupled to the second link and operably coupled to exert a torque on the first joint shaft of the first link. At least a portion of the first actuator extends within the second link middle portion. The third link includes a third link first end portion, a third link middle portion, a third link second end portion. The third link middle portion extends between the third link first end portion and third link second end portion. The third link first end portion is coupled to the second link second end portion via the second joint shaft. The third link middle portion extends in a second direction. The second direction includes a component parallel to the second rotational axis and a component parallel to the third rotational axis. The second actuator is coupled to the third link and operably coupled to exert a torque on the second link second joint shaft. At least a portion of the second actuator extends within the third link middle portion.

In some embodiments, the first actuator drives rotation about a first actuator axis, and the second actuator drives rotation about a second actuator axis. The first actuator axis and the second rotational axis define a first offset angle larger than 0 degrees and less than 90 degrees. The second actuator axis and the third rotational axis define a second offset angle larger than 0 degrees and less than 90 degrees. In some embodiments, the first offset angle is between about 25 degrees and 65 degrees, and the second offset angle is between about 15 degrees and 75 degrees.

In some embodiments, a control input assembly includes a gimbal link, a transmission housing, a gear shaft, an output gear, an actuator, an input gear, and a joint shaft. The gimbal link includes a first end portion and a second end portion, the transmission housing being mounted to the first end portion of the gimbal link. The joint shaft is rotatably supported by the first end portion of the gimbal link. The transmission housing includes a gear shaft support portion and an actuator support portion. The gear shaft is rotatably supported by the gear shaft support portion of the transmission housing to rotate about a gear axis. The output gear is mounted on the gear shaft. The actuator includes a motor, a motor body, and a motor shaft rotatable about an actuator axis. At least a portion of the motor body is mounted to the actuator support portion of the transmission housing. The input gear is mounted on the motor shaft and meshed with the output gear to transfer torque to the joint shaft. The gear axis and the actuator axis define an offset angle larger than 0 degrees and less than 90 degrees.

In some embodiments, the offset angle is between about 45 degrees and 85 degrees. In some embodiments, the input gear comprises a first number of gear teeth, the output gear comprises a second number of gear teeth, and the second number of gear teeth is larger than the first number of gear teeth. In some embodiments, a gear ratio of the output gear to the input gear is between about 5:1 to 7:1. In some embodiments, a gear ratio of the output gear to the input gear is about 6.9:1.

In some embodiments, a control input assembly includes a first gimbal link, a second gimbal link and a motor. The first gimbal link includes a distal end portion. The second gimbal link includes a proximal end portion coupled to the distal end portion of the first gimbal link to rotate about a gimbal link axis of rotation with reference to the first gimbal link. The motor is mounted to one of the first gimbal link or the second gimbal link. The motor includes a motor shaft coupled to drive the second gimbal link about the gimbal link axis of rotation. The motor shaft rotates about a motor shaft axis of rotation, the motor shaft axis being at an acute angle relative to the gimbal link axis of rotation. In some embodiments, the first gimbal link comprises a curved portion and the motor is mounted within the curved portion of the first gimbal link. The first gimbal link includes a proximal end portion and the curved portion of the first gimbal link extends between the proximal and distal end portions of the first gimbal link.

In some embodiments, the second gimbal link includes a curved portion and the motor is mounted within the curved portion of the second gimbal link. The second gimbal link includes a distal end portion and the curved portion of the second gimbal link extends between the proximal and distal end portions of the second gimbal link. In some embodiments, the control input assembly includes an operator handle coupled to the second gimbal link. In some embodiments the control input assembly is embodied in a control unit of a telesurgical system.

Other control input devices, related components, medical device systems, and/or methods according to embodiments will be or become apparent to one with skill in the art upon review of the following drawings and detailed description. It is intended that all such additional control input devices, related components, medical device systems, and/or methods included within this description be within the scope of this disclosure.

DETAILED DESCRIPTION

Figure 1:
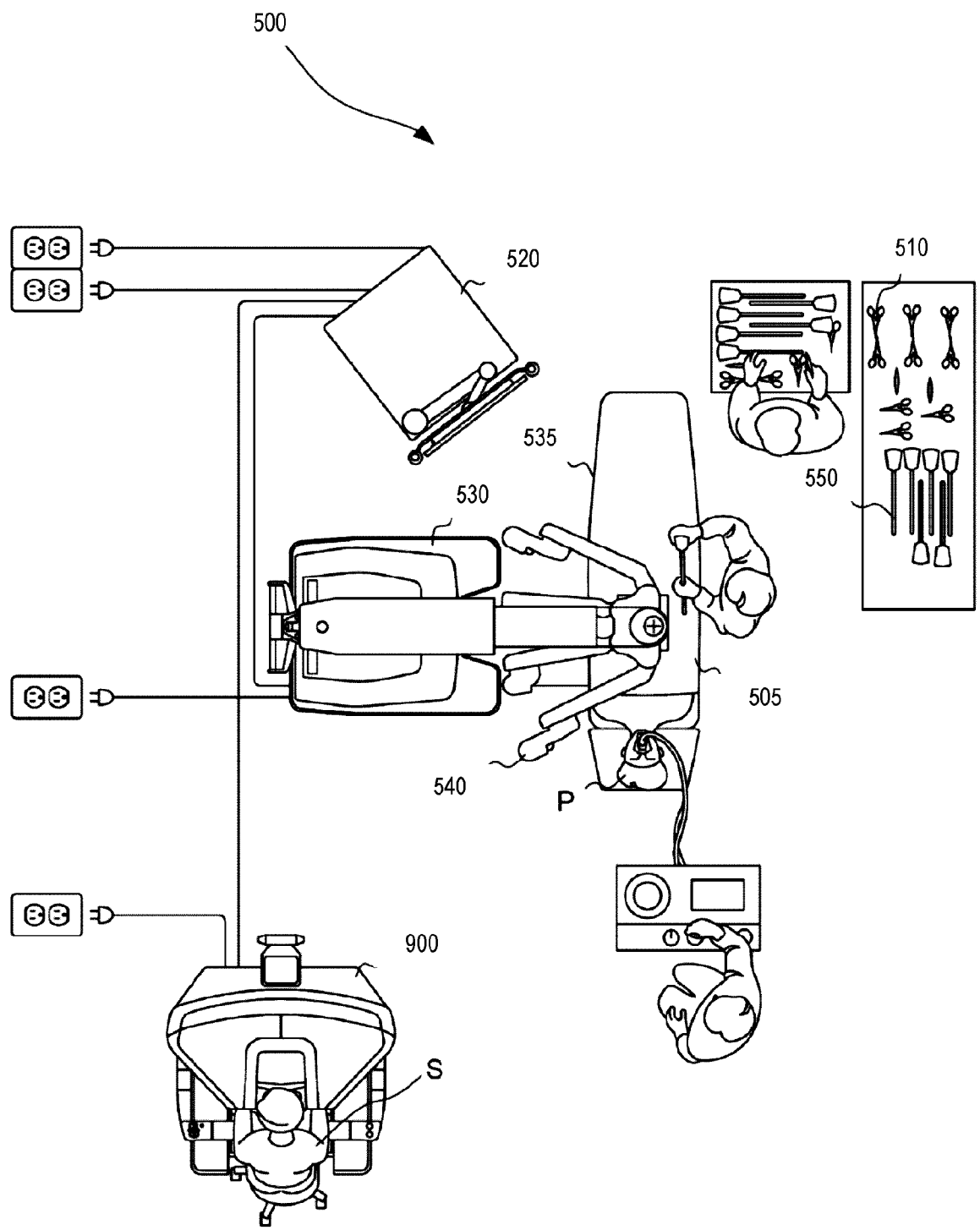
FIG. 1 is a plan view of a minimally invasive teleoperated medical system according to an embodiment being used to perform a medical procedure such as surgery.

The embodiments described herein can advantageously be used in a wide variety of teleoperated surgical systems and allow a user to control functions of various types of mechanisms, instruments, and tools.

As used herein, the term "about" when used in connection with a referenced numeric indication means the referenced numeric indication plus or minus up to 10 percent of that referenced numeric indication. For example, the language "about 50" covers the range of 45 to 55. Similarly, the language "about 5" covers the range of 4.5 to 5.5.

As used in this specification and the appended claims, the word "distal" refers to direction towards a work site, and the word "proximal" refers to a direction away from the work site. Thus, for example, the end of a tool that is closest to the target tissue would be the distal end of the tool, and the end opposite the distal end (i.e., the end manipulated by the user or coupled to the actuation shaft) would be the proximal end of the tool.

Further, specific words chosen to describe one or more embodiments and optional elements or features are not intended to limit the invention. For example, spatially relative terms—such as "beneath", "below", "lower", "above", "upper", "proximal", "distal", and the like—may be used to describe the relationship of one element or feature to another element or feature as illustrated in the figures. These spatially relative terms are intended to encompass different positions (i.e., translational placements) and orientations (i.e., rotational placements) of a device in use or operation in addition to the position and orientation shown in the figures. For example, if a device in the figures is turned over, elements described as "below" or "beneath" other elements or features would then be "above" or "over" the other elements or features. Thus, the term "below" can encompass both positions and orientations of above and below. A device may be otherwise oriented (e.g., rotated 90 degrees or at other orientations) and the spatially relative descriptors used herein interpreted accordingly. Likewise, descriptions of movement along (translation) and around (rotation) various axes includes various spatial device positions and orientations. The combination of a body's position and orientation define the body's pose.

Similarly, geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

In addition, the singular forms "a", "an", and "the" are intended to include the plural forms as well, unless the context indicates otherwise. The terms "comprises", "includes", "has", and the like specify the presence of stated features, steps, operations, elements, components, etc. but do not preclude the presence or addition of one or more other features, steps, operations, elements, components, or groups.

Unless indicated otherwise, the terms apparatus, medical device, instrument, and variants thereof, can be interchangeably used.

Aspects of the invention are described primarily in terms of an implementation using a da Vinci® Surgical System, commercialized by Intuitive Surgical, Inc. of Sunnyvale, California. Examples of such surgical systems are the da Vinci Xi® Surgical System (Model IS4000), da Vinci X® Surgical System (Model IS4200), and the da Vinci Si® Surgical System (Model IS3000). Knowledgeable persons will understand, however, that inventive aspects disclosed herein may be embodied and implemented in various ways, including computer-assisted, non-computer-assisted, and hybrid combinations of manual and computer-assisted embodiments and implementations. Implementations on da Vinci® Surgical Systems (e.g., the Model IS4000, the Model IS3000, the Model IS2000, the Model IS1200) are merely presented as examples, and they are not to be considered as limiting the scope of the inventive aspects disclosed herein. As applicable, inventive aspects may be embodied and implemented in both relatively smaller, hand-held, hand-operated devices and relatively larger systems that have additional mechanical support.

FIG. 1 is a plan view illustration of a computer-assisted teleoperation system. Shown is a medical device, which is a Minimally Invasive Robotic Surgical (MIRS) system 500 (also referred to herein as a minimally invasive teleoperated surgery system), used for performing a minimally invasive diagnostic or surgical procedure on a patient P who is lying on an operating table 505. The system can have any number of components, such as a user control unit 900 for use by a surgeon or other skilled clinician S during the procedure. The MIRS system 500 can further include a manipulator unit 530 (which may be referred to as a surgical robot), and an optional auxiliary equipment unit 520. The manipulator unit 530 can include an arm assembly 540 and a tool assembly removably coupled to the arm assembly 540. The manipulator unit 530 can manipulate at least one removably coupled instruments 550 (also referred to herein as a "tool") through a minimally invasive incision in the body or natural orifice of the patient P while the surgeon S views the surgical site and controls movement of the instrument 550 through the user control unit 900. An image of the surgical site is obtained by an endoscope (not shown), such as a stereoscopic endoscope, which can be manipulated by the manipulator unit 530 to orient the endoscope. The auxiliary equipment unit 520 can be used to process the images of the surgical site for subsequent display to the Surgeon S through the user control unit 900. The number of instruments 550 used at one time will generally depend on the diagnostic or surgical procedure and the space constraints within the operating room, among other factors. If it is necessary to change one or more of the instruments 550 being used during a procedure, an assistant removes the instrument 550 from the manipulator unit 530 and replaces it with another instrument 550 from a tray 510 in the operating room. Although shown as being used with the instruments 550, any of the instruments described herein can be used with the MIRS 500. For example, the instruments 550 can be, but are not limited to, clamps, graspers, scissors, scalpel, blade, staplers, hooks, suction irrigation tools, clip appliers, needle holders, electrocautery devices, and the like.

Figure 2:
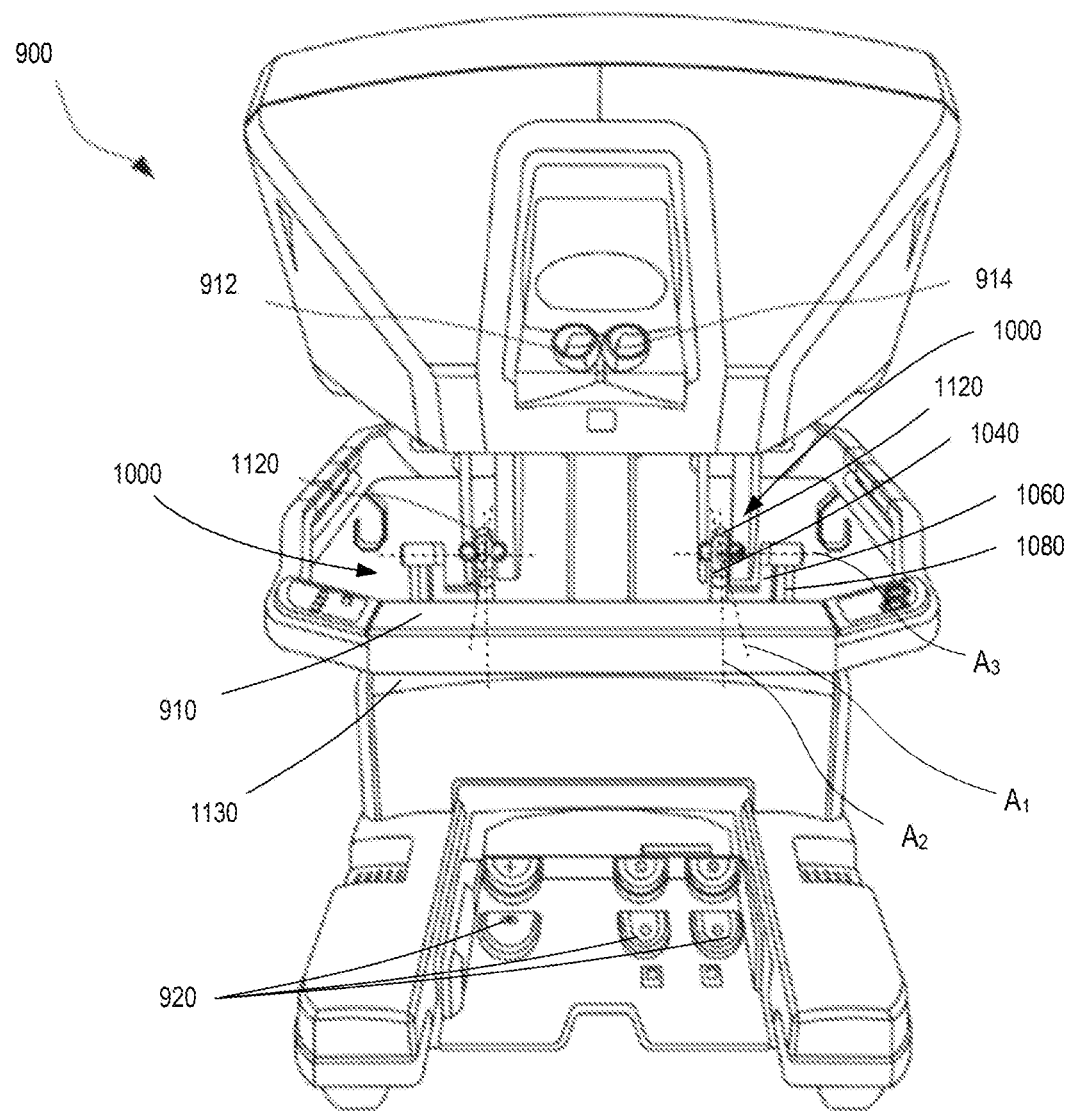
FIG. 2 is a perspective view of a user control console of the minimally invasive teleoperated surgery system shown in FIG. 1.

FIG. 2 is a perspective view of the user control unit 900. The user control unit 900 includes a viewer with a left eye display 912 and a right eye display 914 for presenting the surgeon S with a coordinated stereo view of the surgical site that enables depth perception. The user control unit 900 further includes one or more input control devices 1000 (also referred to as master controllers), which in turn cause the manipulator unit 530 (shown in FIG. 1) to manipulate one or more tools. The input control devices 1000 provide at least the same degrees of freedom as instruments 550 with which they are associated to provide the surgeon S with telepresence, or the perception that the input control devices 1000 are integral with (or are directly connected to) the instruments 550. For example, each input control device 1000 includes a handle 1120 that can be gripped and repositioned by the surgeon S. The handle 1120 is attached to a first gimbal link 1040, a second gimbal link 1060, and a third gimbal link 1080. The handle 1120 is rotatably mounted to the first gimbal link 1040 about axis $A_1$, the first gimbal link 1040 is rotatably mounted to the second gimbal link 1060 about axis $A_2$, and the third gimbal link 1080 is rotatably mounted to a base 1130 of the user control unit 900. In this manner, the user control unit 900 provides the surgeon S with a strong sense of directly controlling the instruments 550. The handle 1120 and/or one or more of the gimbal links 1040, 1060, 1080 includes sensors and/or actuators (not shown) to detect a change in position and orientation of the handle 1120 in three-dimensional space, which is, in turn, used to move an instrument 550 in use in a corresponding manner.

In some embodiments, the handles 1120 further include one or more buttons (not shown) used to control a function of the instrument 550, such as a grasping or cutting function, for example. To this end, position, force, and tactile feedback sensors (not shown) may be employed to transmit position, force, and tactile sensations from the instruments 550 back to the surgeon's hands through the input control devices 1000. In some embodiments, the user control unit 900 includes one or more foot controls 920 positioned below the input control devices 1000. The foot controls 920 can be depressed, slid, and/or otherwise manipulated by a user's feet to input various commands to the teleoperated system while the surgeon S is sitting behind the user control unit 900.

The user control unit 900 is shown in FIG. 1 as being in the same room as the patient P so that the surgeon S can directly monitor the procedure, be physically present if necessary, and speak to an assistant directly rather than over the telephone or other communication medium. In some embodiments, the user control unit 900 and the surgeon S can be in a different room, a completely different building, or other remote location from the patient allowing for remote surgical procedures.

Figure 3:
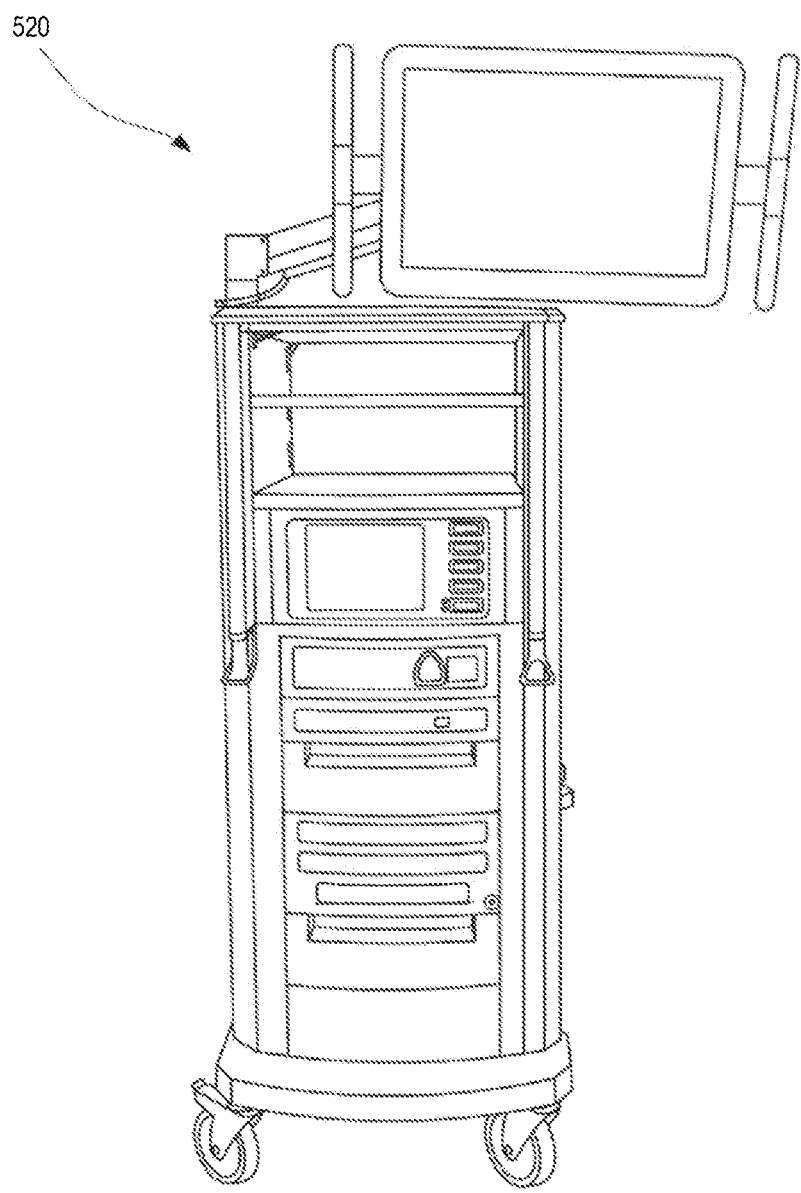
FIG. 3 is a perspective view of an auxiliary unit of the minimally invasive teleoperated surgery system shown in FIG. 1.

FIG. 3 is a perspective view of the auxiliary equipment unit 520. The auxiliary equipment unit 520 can be coupled with the endoscope (not shown) and can include one or more processors to process captured images for subsequent display, such as via the user control unit 900, or on another suitable display located locally and/or remotely. For example, where a stereoscopic endoscope is used, the auxiliary equipment unit 520 can process the captured images to present the surgeon S with coordinated stereo images of the surgical site via the left eye display 912 and the right eye display 914. Such coordination can include alignment between the opposing images and can include adjusting the stereo working distance of the stereoscopic endoscope. As another example, image processing can include the use of previously determined camera calibration parameters to compensate for imaging errors of the image capture device, such as optical aberrations.

Figure 4:
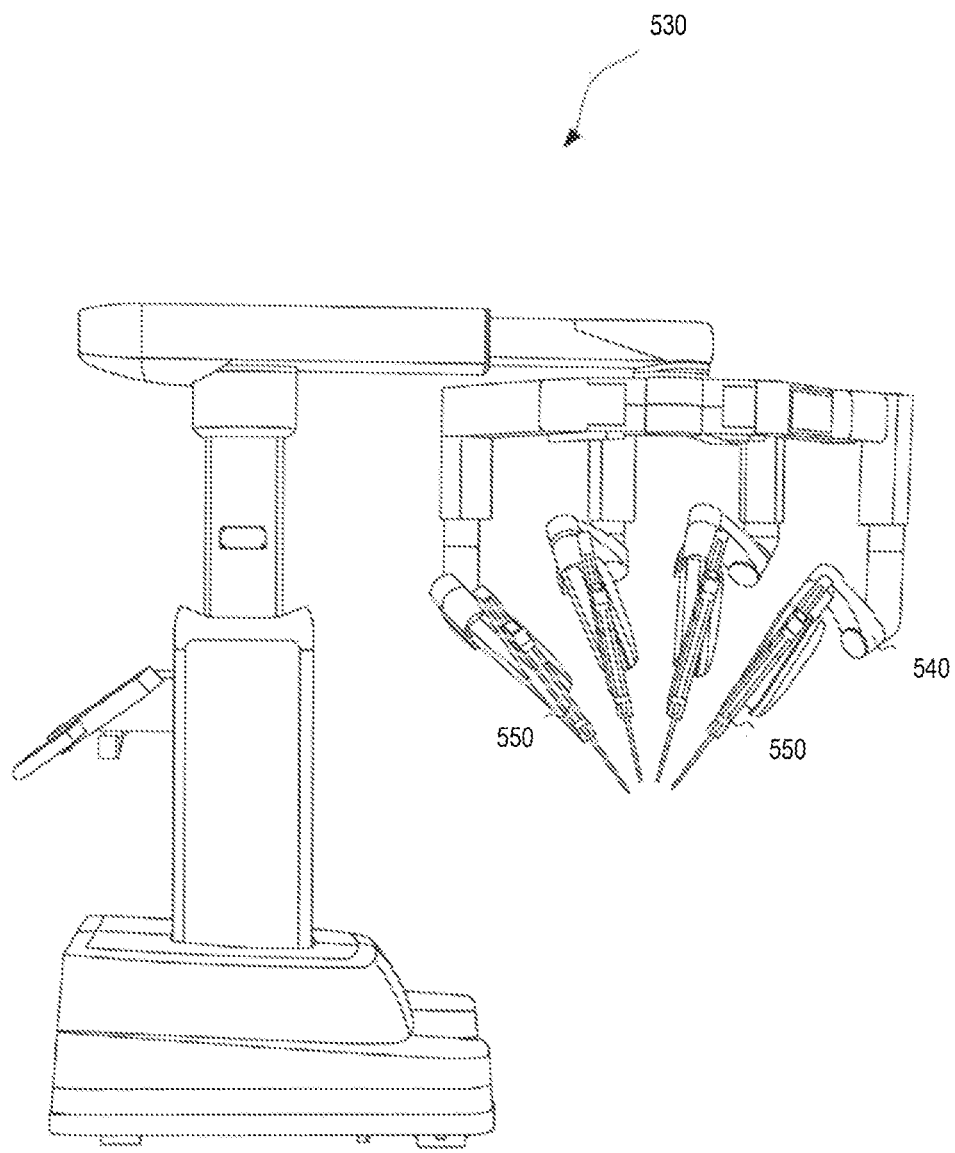
FIG. 4 is a front view of a manipulator unit, including a plurality of instruments, of the minimally invasive teleoperated surgery system shown in FIG. 1.

FIG. 4 shows a front perspective view of the manipulator unit 530. The manipulator unit 530 includes the components (e.g., arms, linkages, motors, sensors, and the like) to provide for the manipulation of the instruments 550 and an imaging device (not shown). For example, the imaging device is a stereoscopic endoscope, used for the capture of images of the site of the procedure. Specifically, the instruments 550 and the imaging device can be manipulated by teleoperated mechanisms having a number of joints. Moreover, the instruments 550 and the imaging device are positioned and manipulated through incisions or natural orifices in the patient P in a manner such that a software and/or kinematic remote center of motion is maintained at the incision or orifice. In this manner, the incision size can be minimized.

Figure 5:
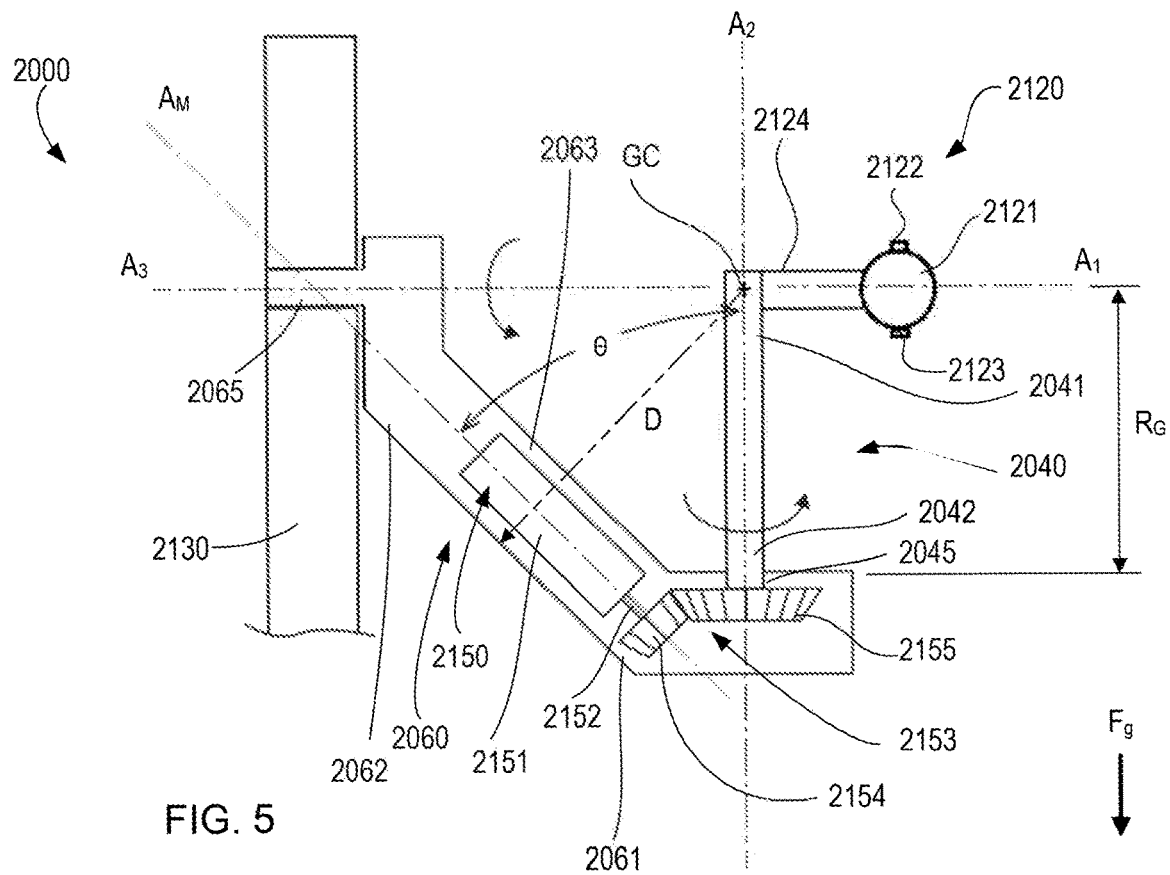
FIG. 5 is a diagrammatic illustration of an input control device according to an embodiment.

FIG. 5 is a schematic illustration of an input control device 2000 according to an embodiment. The input control device 2000 includes an input handle 2120, a first link 2040 (which functions as a first gimbal link), a second link 2060 (which functions as a second gimbal link), and a base portion 2130. The input handle 2120 includes a handle portion 2121, a first handle input 2122, a second handle input 2123, and a handle input shaft 2124. The handle input shaft 2124 defines a first rotational axis $A_1$ (which may function as a roll axis; the term roll is arbitrary) and is rotatably coupled to the first link 2040. The handle portion 2121 is supported on the handle input shaft 2124 and is configured to be rotated relative to the first link 2040 about the first rotational axis $A_1$. In some embodiments, the input shaft 2124 extends at least partially within the first link 2040. The first handle input 2122 and the second handle input 2123 can be manipulated to produce a desired action at the end effector (not shown). For example, in some embodiments, the first handle input 2122 and the second handle input 2123 can be squeezed together to produce a gripping movement at the end effector. In other embodiments, however, the input handle 2120 need not include the handle inputs.

The first link 2040 includes a first end portion 2041, a second end portion 2042, and a first joint shaft 2045. The second link 2060 includes a first end portion 2061, a second end portion 2062, and a second joint shaft 2065. The second end portion 2042 of the first link 2040 is rotatably coupled to the first end portion 2061 of the second link 2060 via the first joint shaft 2045. Similarly stated, the second end portion 2042 of the first link 2040 is coupled to the first end portion 2061 of the second link 2060 such that the first joint shaft 2045 extends within the second link 2060. The first joint shaft 2045 defines a second rotational axis $A_2$ (which may function as a yaw axis; the term yaw is arbitrary). In some embodiments, the second rotational axis $A_2$ is perpendicular to the first rotational axis $A_1$. An intersection of the first rotational axis $A_1$ and the second rotational axis $A_2$ defines a gimbal center GC. In some embodiments, the distance from the gimbal center GC to the first end portion 2061 of the second link 2060 defines a gimbal radius $R_G$.

The second link 2060 further includes a link housing 2063 extending between the first end portion 2061 and the second end portion 2062. The second link 2060 is rotatably coupled to the base portion 2130 via the second joint shaft 2065. Similarly stated, the second link 2060 is coupled to the base portion 2130 such that the second joint shaft 2065 extends within the base portion 2130. The second joint shaft 2065 defines a third rotational axis $A_3$ (which may function as a pitch axis; the term pitch is arbitrary). In some embodiments, the third rotational axis $A_3$ is perpendicular to the second rotational axis $A_2$. In some embodiments, as shown in FIG. 5, the first rotational axis $A_1$ and the third rotational axis $A_3$ are oriented co-linearly, however, it will be appreciated by one skilled in the art that the first rotational axis $A_1$ and the third rotational axis $A_3$ can be positioned to intersect one another when the first link 2040 is rotated about the second rotational axis $A_2$ from the initial position (which may also be referred to as an initial pose) shown in FIG. 5.

In some embodiments, the input control device 2000 includes an actuator 2150 mounted in the second link 2060 within the link housing 2063. The actuator 2150 defines an actuator axis $A_M$. The actuator 2150 is configured to exert a torque on or receive torque from the first joint shaft 2045. In some embodiments, the actuator 2150 is a motor 2151 that includes a motor shaft 2152. As shown, the motor shaft 2152 is operatively coupled to the first joint shaft 2045 by a driving gear 2154 and a driven gear 2155. The driving gear 2154 is fixed to the motor shaft 2152 and is configured to rotate together with the motor shaft 2152. The driven gear 2155 is configured to mesh with and be driven by the driving gear 2154. In some embodiments, the driving gear 2154 includes a first number of teeth, the driven gear 2155 includes a second number of teeth, and the second number of teeth is greater than the first number of teeth. In some embodiments, a gear ratio of the driven gear 2155 to the driving gear 2154 is about 5:1 to about 7:1. In some embodiments, the driving gear 2154 is a straight spur gear or a bevel gear. In some embodiments, the driven gear 2155 is a bevel gear. Although directly driven gears are shown, it will be appreciated that a pulley and belt system, gear and chain system, or other transmission systems can be employed.

In some embodiments, the motor shaft 2152 extends along the actuator axis $A_M$. In some embodiments, one or more encoders or sensors are provided to detect a rotational position of the motor shaft 2152 and/or the first joint shaft 2045. As shown, the actuator axis $A_M$ and the second rotational axis $A_2$ define an offset angle θ that is less than 90 degrees. In some embodiments, the offset angle θ is less than about 60 degrees. In some embodiments, the offset angle θ is between about 20 degrees and 70 degrees. In some embodiments, the offset angle θ is between about 25 degrees and 65 degrees. In some embodiment the offset angle θ is between about 30 degrees and 60 degrees.

In use, the input control device 2000 can be manipulated by a user, such as the surgeon S, to control a surgical instrument (such as the instruments 550 described herein). As the surgeon S grips and repositions the handle portion 2121 about one or more of the first rotational axis $A_1$, the second rotational axis $A_2$, and/or the third rotational axis $A_3$, a corresponding instrument or tool connected to a user control unit (such as the user control unit 900 described herein) and controlled by the input control device 2000 can be repositioned in a corresponding manner. For example, if the tool selected is a grasper that includes a vertically oriented tool shaft and an end effector, clockwise rotation of the handle portion 2121 about the second rotational axis $A_2$ may cause the end effector to rotate clockwise about a longitudinal axis of the tool shaft.

As shown in FIG. 5, the gravitation force $F_g$ acts in a downward direction in the diagram. It will be appreciated that when the second link 2060 is rotated relative to the third rotational axis $A_3$, the gravitational force $F_g$ will act on the handle portion 2121 and cause the first link 2040 to rotate about the second rotational axis $A_2$, for example. In other words, as the second link 2060 is moved out of the initial position (e.g., resting position) shown in FIG. 5, the gravitation force $F_g$ will act on one or more of the input handle 2120, the first link 2040, and the second link 2060. In some embodiments, the actuator 2150 can be operated to output a torque to the first joint shaft 2045 to counteract the torque applied by the gravitational force $F_g$ on the handle portion 2121. As such, once the surgeon S has moved the handle portion 2121 to a particular position and orientation, the actuator 2150 can be operated to hold the input control device 2000 at that last position and orientation placed by the surgeon S. The tool or instrument at the patient operating site (such as instrument 500 described herein) can also be held at a corresponding position and orientation until the surgeon S provides a new input. By offsetting the gravitational forces acting on the input control device 2000, the surgeon S is provided with a more natural and less restrictive way of controlling the instrument 500. As a result the input control devices described herein are operable to provide the surgeon S with a more fluid and weightless experience by isolating forces acting on the input control device 2000 if left unassisted. In doing so, the input control devices described herein may be able to provide improved fine motor control of the instrument 500 and/or reduce fatigue experienced by the surgeon S during operation. In some embodiments, the actuator 2150 can be operated to output a torque to resist movement input by the surgeon S to simulate a condition observed at the tool. For example, if the tool at the patient operating site is controlled by the surgeon S to move from open space to contacting a target tissue, the actuator 2150 can produce a torque to simulate the contact and resistance observed by the tool when the tool contacts the target tissue and/or when the tool is pressed into the target tissue. In other words, the actuator 2150 is configured to provide feedback to the surgeon S through the input control device 2000 based on inputs or conditions observed by the tool.

To further improve the dynamics of master controllers, reduction in mass and moment of inertia ($I=m \cdot r^2$) at the input control devices minimizes the external forces that would need to be offset, thereby reducing the strain or output requirements on the actuator 2150. Additionally or alternatively, the reduction in mass and moment of inertia can enable smaller actuators to be employed thereby further reducing the total mass of the input control devices. For example, in conventional input control devices with gimbal links, the gimbal links typically include L-shaped enclosures such that components housed therein (e.g., actuators) are spaced substantially away from a gimbal center. As contemplated in the present disclosure, reduction in mass and moment of inertia can be achieved by moving a center of mass of the gimbal links and components housed therein (e.g., the actuator 2150) towards a gimbal center GC. As shown, the second link 2060 includes a single diagonal leg (e.g., hypotenuse) to reduce the total length and mass associated with the gimbal link. The location of the diagonal link further improves moment of inertia by moving a center of gravity closer to the gimbal center and the axes about which the second link 2060 rotates. Furthermore, components that would otherwise be housed in one leg of the L-shaped leg can be housed within the diagonal leg, further improving the moment of inertia.

In some embodiments, the link housing 2063 of the second link 2060 extends at an angle relative to the second rotational axis $A_2$ and the rotational axis $A_3$. In some embodiments, the link housing 2063 extends parallel along the actuator axis $A_M$. In some embodiments, the link housing 2063 extends at an angle of between about 20 degrees and 70 degrees relative to the second rotational axis $A_2$. In some embodiments, at least a portion of the link housing 2063 is spaced a distance away from the gimbal center GC, the distance being between 0.75 to 1.25 times the gimbal radius $R_G$. For example, as shown in FIG. 5, a distance D is about 1.25 times the gimbal radius $R_G$. At least a portion of the link housing 2063 is spaced within a distance of between 0.75 to 1.25 times the gimbal radius $R_G$. In some embodiments, the link housing 2063 includes an offset gimbal surface extending along the actuator axis $A_M$, and the offset gimbal surface intersects an arc defined by the gimbal radius $R_G$.

Figure 6:
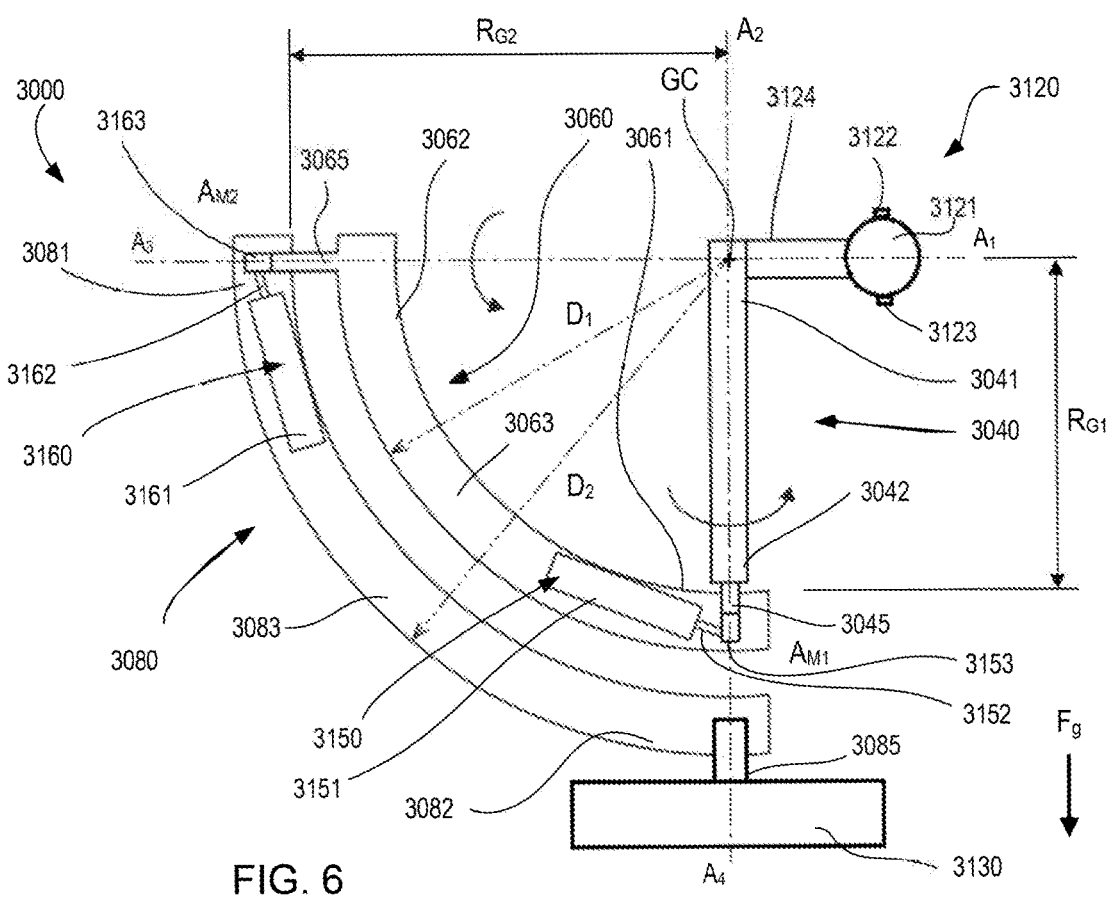
FIG. 6 is a diagrammatic illustration of an input control device according to an embodiment.
Figure 7:
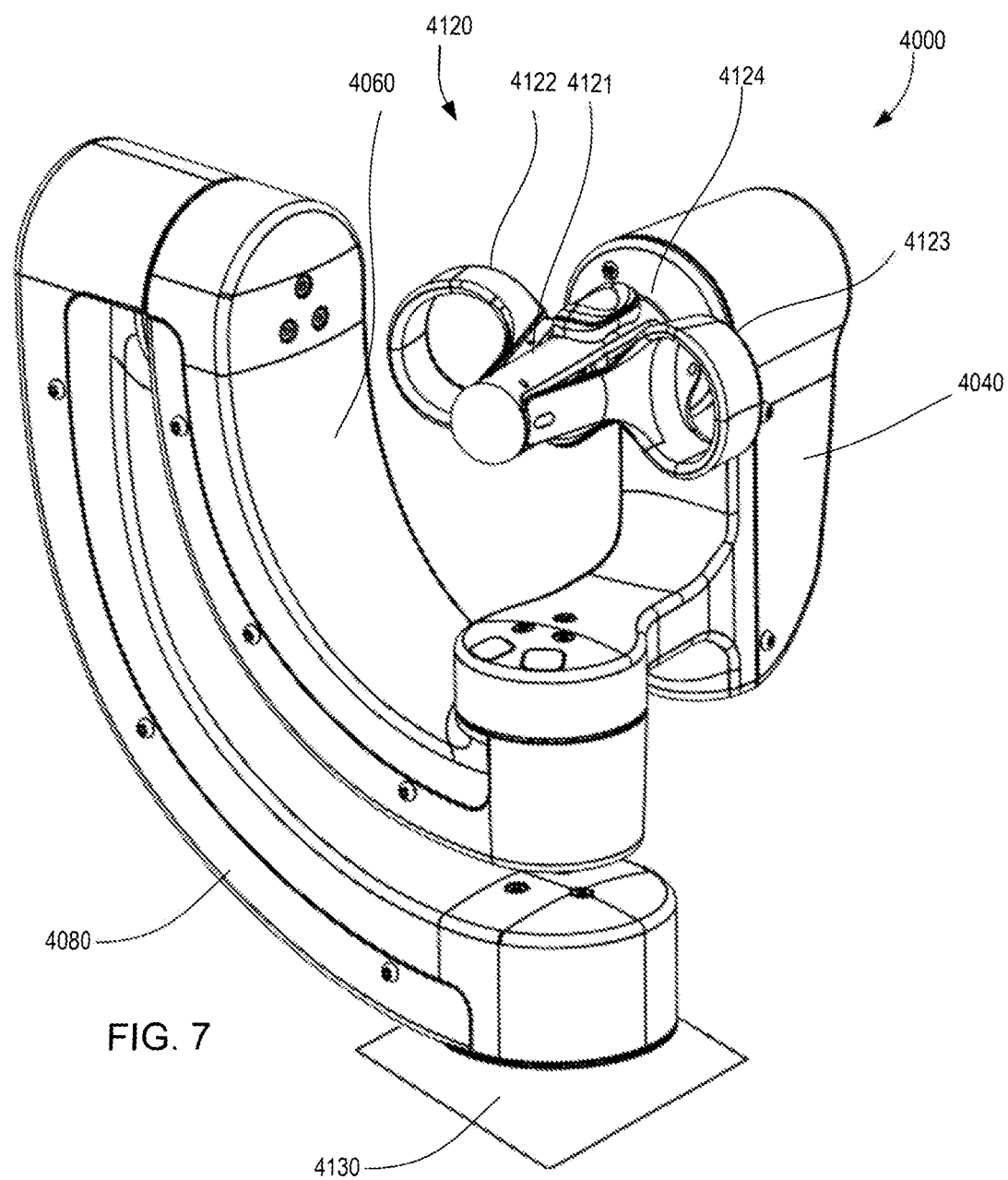
FIG. 7 is a front perspective view of an input control device according to an embodiment.

In some embodiments, a link of an input control device can include a curved portion. For example, FIG. 6 is a schematic illustration of an input control device 3000 according to an embodiment. The input control device 3000 includes an input handle 3120, a first link 3040, a second link 3060, a third link 3080, and a base portion 3130. The input handle 3120 includes a handle portion 3121, a first handle input 3122, a second handle input 3123, and a handle input shaft 3124. The handle input shaft 3124 defines a first rotational axis $A_1$ (which may function as a roll axis; the term roll is arbitrary) and is rotatably coupled to the first link 3040. The handle portion 3121 is supported on the handle input shaft 3124 and is configured to be rotated relative to the first link 3040 about the first rotational axis $A_1$. In some embodiments, the input shaft 3124 extends at least partially within the first link 3040. The first handle input 3122 and the second handle input 3123 can be manipulated to produce a desired action at the end effector (not shown). For example, in some embodiments, the first handle input 3122 and the second handle input 3123 can be squeezed together to produce a gripping movement at the end effector. In other embodiments, however, the input handle 3120 need not include the handle inputs.

The first link 3040 includes a first end portion 3041, a second end portion 3042, and a first joint shaft 3045. The second link 3060 includes a first end portion 3061, a second end portion 3062, and a second joint shaft 3065. The third link 3080 includes a first end portion 3081, a second end portion 3082, and a third joint shaft 3085. The second end portion 3042 of the first link 3040 is rotatably coupled to the first end portion 3061 of the second link 3060 via the first joint shaft 3045. Similarly stated, the second end portion 3042 of the first link 3040 is coupled to the first end portion 3061 of the second link 3060 such that the first joint shaft extends within the second link 3060. The first joint shaft 3045 defines a second rotational axis $A_2$ (which may function as a yaw axis; the term yaw is arbitrary). The second rotational axis $A_2$ is perpendicular to the first rotational axis $A_1$. An intersection of the first rotational axis $A_1$ and the second rotational axis $A_2$ defines a gimbal center GC. In some embodiments, the distance from the gimbal center GC to the first end portion 3061 of the second link 3060 defines a first gimbal radius $R_{G1}$.

The second link 3060 further includes a second link housing 3063 extending between the first end portion 3061 and the second end portion 3062. The second end portion 3062 of the second link 3060 is rotatably coupled to the first end portion 3081 of the third link 3080 via the second joint shaft 3065. Similarly stated, the second link 3060 is coupled to the third link 3080 such that the second joint shaft 3065 extends within the third link 3080. The second joint shaft 3065 defines a third rotational axis $A_3$ (which may function as a pitch axis; the term pitch is arbitrary) and the third rotational axis $A_3$ is perpendicular to the second rotational axis $A_2$. In some embodiments, as shown in FIG. 6, the first rotational axis $A_1$ and the third rotational axis $A_3$ are oriented co-linearly. However, it will be appreciated by one skilled in the art that the first rotational axis $A_1$ and the third rotational axis $A_3$ can be positioned to intersect one another when the first link 3040 is rotated about the second rotational axis $A_2$ from the initial position shown in FIG. 6, for example.

The third link 3080 further includes a third link housing 3083 extending between the first end portion 3081 and the second end portion 3082. The second end portion 3082 of the third link 3080 is rotatably coupled to the base portion 3130 via the third joint shaft 3085. Similarly stated, the third link 3080 is coupled to the base portion 3130 such that the third joint shaft 3085 extends within the base portion 3130. The third joint shaft 3085 defines a fourth rotational axis $A_4$. The fourth rotational axis $A_4$ is perpendicular to the third rotational axis $A_3$. In some embodiments, the distance from the gimbal center GC to the first end portion 3081 of the third link 3080 defines a second gimbal radius $R_{G2}$.

In some embodiments, as shown in FIG. 6, the second rotational axis $A_2$ and the fourth rotational axis $A_4$ are oriented co-linearly, however, it will be appreciated by one skilled in the art that the second rotational axis $A_2$ and the fourth rotational axis $A_4$ can be positioned to intersect one another when the second link 3060 is rotated about the third rotational axis $A_3$ from the initial position shown in FIG. 6, for example.

In some embodiments, the input control device 3000 includes a first actuator 3150 mounted in the second link 3060 within the second link housing 3063. The first actuator 3150 is configured to exert a torque on or receive torque from the first joint shaft 3045. In some embodiments, the first actuator 3150 is a motor 3151 (e.g., electric motor) that includes a motor shaft 3152. The motor shaft 3152 is operatively coupled to the first joint shaft 3045. The input control device 3000 includes a first actuator transmission 3153 mounted within the second link 3060. As shown, the first actuator transmission 3153 is coupled to the first end portion 3061 of the second link 3060. In some embodiments, the first actuator transmission 3153 includes a driving member and a driven member (not shown). In some embodiments, the driving member is fixed to the motor shaft 3152 and configured to rotate together with the motor shaft 3152. The driven member can be configured to engage and be driven by the driving member, which in turn drives the first joint shaft 3045.

In some embodiments, the input control device 3000 includes a second actuator 3160. The second actuator 3160 is mounted in the third link 3080 within the third link housing 3083. The second actuator 3160 is configured to exert a torque on or receive torque from the second joint shaft 3065. In some embodiments, the second actuator 3160 is a motor 3161 that includes a motor shaft 3162. The motor shaft 3162 is operatively coupled to the second joint shaft 3065. The input control device 3000 includes a second actuator transmission 3163 mounted within the third link 3080. As shown, the second actuator transmission 3163 is coupled to the first end portion 3081 of the third link 3080. In some embodiments, the second actuator transmission 3163 includes a driving member and a driven member (not shown). In some embodiments, the driving member is fixed to the motor shaft 3162 and configured to rotate together with the motor shaft 3162. The driven member can be configured to engage and be driven by the driving member, which in turn drives the second joint shaft 3065.

As shown in FIG. 6, if the gravitation force $F_g$ acts downwardly in the diagram, it will be appreciated that as the second link 3060 is rotated relative to the third rotational axis $A_3$, the gravitational force $F_g$ will act on the handle portion 3121 and cause the first link 3040 to rotate about the second rotational axis $A_2$, for example. In other words, as the second link 3060 is moved out of the initial position (e.g., resting position) shown in FIG. 6, the gravitation force $F_g$ will act on one or more of the input handle 3120, the first link 3040, the second link 3060, and the third link 3080. Similar to the actuator 2150 described above, the first actuator 3150 and/or the second actuator 3160 can be operated to output torque to counteract the gravitational force $F_g$ applied on one or more of the first link 3040, the second link 3060, and the input handle 3120. For example, if the second link 3060 is rotated away from the resting position, the actuator 3160 can be operated to output a torque to the second joint shaft 3065 to counteract the torque applied by the gravitational force $F_g$ on the first link 3040, the second link 3060, and the input handle 3120. As such, once the surgeon S has moved the handle portion 3121 to a particular position and orientation, the actuator 3150 can be operated to hold the input control device 3000 at that last position and orientation placed by the surgeon S. The tool or instrument at the patient operating site (such as instrument 500 described herein) can also be held at a corresponding position and orientation until the surgeon S provides a new input. By offsetting the gravitational forces acting on the input control device 3000, the surgeon S is provided with a more natural and less restrictive way of controlling the instrument 500. As a result the input control devices described herein are operable to provide the surgeon S with a more fluid and weightless experience by isolating forces acting on the input control device 3000 if left unassisted. In doing so, the input control devices described herein may be able to provide improved fine motor control of the instrument 500 and/or reduce fatigue experienced by the surgeon S during operation. In some embodiments, the first actuator 3150 and/or the second actuator 3160 can be operated to output a torque to resist movement input by the surgeon S to simulate a condition observed at the tool and provide feedback to the surgeon S.

As described herein, the dynamics of master controllers can be improved by reducing the overall weight and moment of inertia at the input control devices. As shown in FIG. 6, the second link housing 3063 is curved and extends between the first end portion 3061 of the second end portion 3062. In some embodiments, the second link housing 3063 has a radius of curvature that is between about 0.5 to 1.5 times the first gimbal radius $R_{G1}$. In some embodiments, the second link housing 3063 has a radius of curvature that is between about 0.75 to 1.25 times the first gimbal radius $R_{G1}$. For example, as shown in FIG. 6, a distance $D_1$ is about 1.25 times the first gimbal radius $R_{G1}$. Similarly stated, a curvature of the second link housing 3063 need not follow a circular curvature. Instead, the curved portion can include a blended curve defined by a variable or multiple radii of curvature. In some embodiments, a first gimbal envelope is defined as a spherical volume centered about the gimbal center GC and characterized by a first envelope radius. In some embodiments, the first envelope radius is between about 0.75 to 1.25 times the first gimbal radius $R_{G1}$. A middle portion of the second link housing 3063 extends into or within the first gimbal envelope.

As shown, the third link housing 3083 is curved and extends between the first end portion 3081 of the second end portion 3082. In some embodiments, the third link housing 3083 has a radius of curvature that is between about 0.5 to 1.5 times the second gimbal radius $R_{G2}$. In some embodiments, the third link housing 3083 has a radius of curvature that is between about 0.75 to 1.25 times the second gimbal radius $R_{G2}$. For example, as shown in FIG. 6, a distance $D_2$ is about 1.25 times the gimbal radius $R_{G2}$. Similarly stated, a curvature of the third link housing 3083 need not follow a circular curvature. Instead, the curved portion can include a blended curve defined by a variable or multiple radii of curvature. In some embodiments, a second gimbal envelope is defined as a spherical volume centered about the gimbal center GC and characterized by a second envelope radius. In some embodiments, the second envelope radius is between about 0.75 to 1.25 times the second gimbal radius $R_{G2}$. A middle portion of the third link housing 3083 extends into or within the second gimbal envelope.

FIGS. 7-13 show views of an input control device 4000 according to an embodiment. The input control device 4000 includes a first link 4040 (which functions as a first gimbal link), a second link 4060 (which functions as a second gimbal link), a third link 4080 (which functions as a third gimbal link), and an input handle 4120. The input control device 4000 is mounted to a base portion 4130, which may be a part of a user control unit, such as the user control unit 900 described herein. The input handle 4120 includes a handle portion 4121, a first handle input 4122, a second handle input 4123, and a handle input shaft 4124. As shown generally in FIGS. 10 and 11, the handle input shaft 4124 defines a first rotational axis $A_1$ (which may function as a roll axis; the term roll is arbitrary) and is rotatably coupled to the first link 4040. The handle portion 4121 is supported on the handle input shaft 4124 and is configured to be rotated relative to the first link 4040 about the first rotational axis $A_1$. The input shaft 4124 extends at least partially within the first link 4040. The first handle input 4122 and the second handle input 4123 can be manipulated to produce a desired action at the end effector (not shown). For example, in some embodiments, the first handle input 4122 and the second handle input 4123 can be squeezed together to produce a gripping movement at the end effector. The first and second handle inputs 4122, 4123 can be similar to the grip members shown and described in in U.S. Patent Application Pub. No. US 2020/0015917 A1 (filed Jun. 14, 2019), entitled "Actuated Grips for Controller," which is incorporated herein by reference in its entirety. For example, In other embodiments, however, the input handle 4120 need not include the handle inputs.

Figure 10:
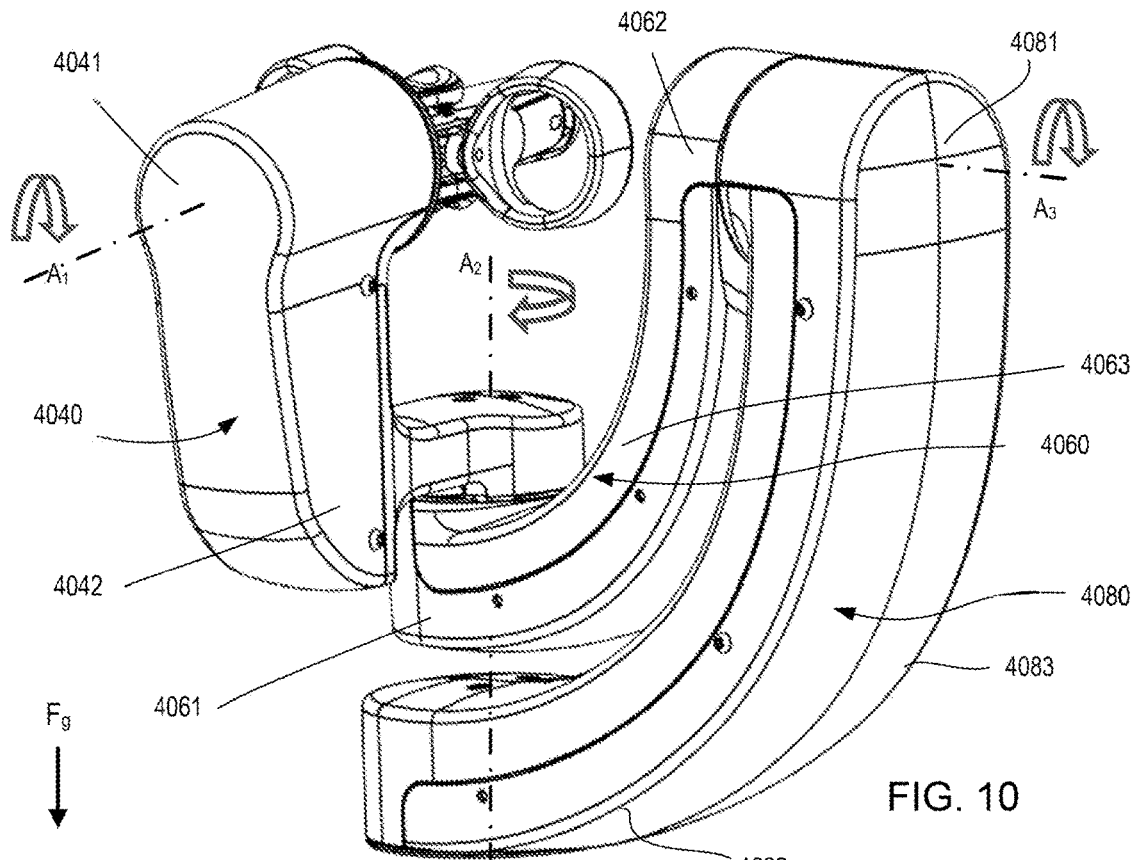
FIG. 10 is a rear perspective view of the input control device of FIG. 7 in a first orientation.
Figure 11:
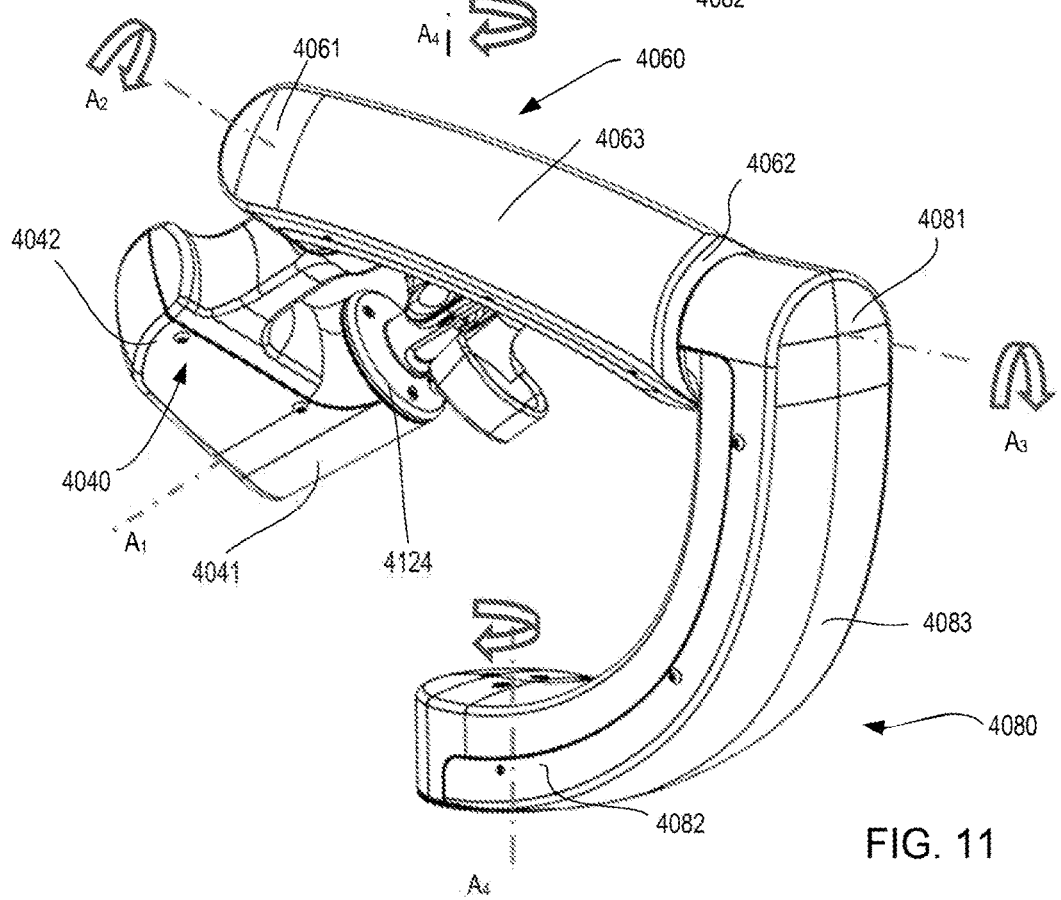
FIG. 11 is a rear perspective view of the input control device of FIG. 7 in a second orientation.
Figure 12:
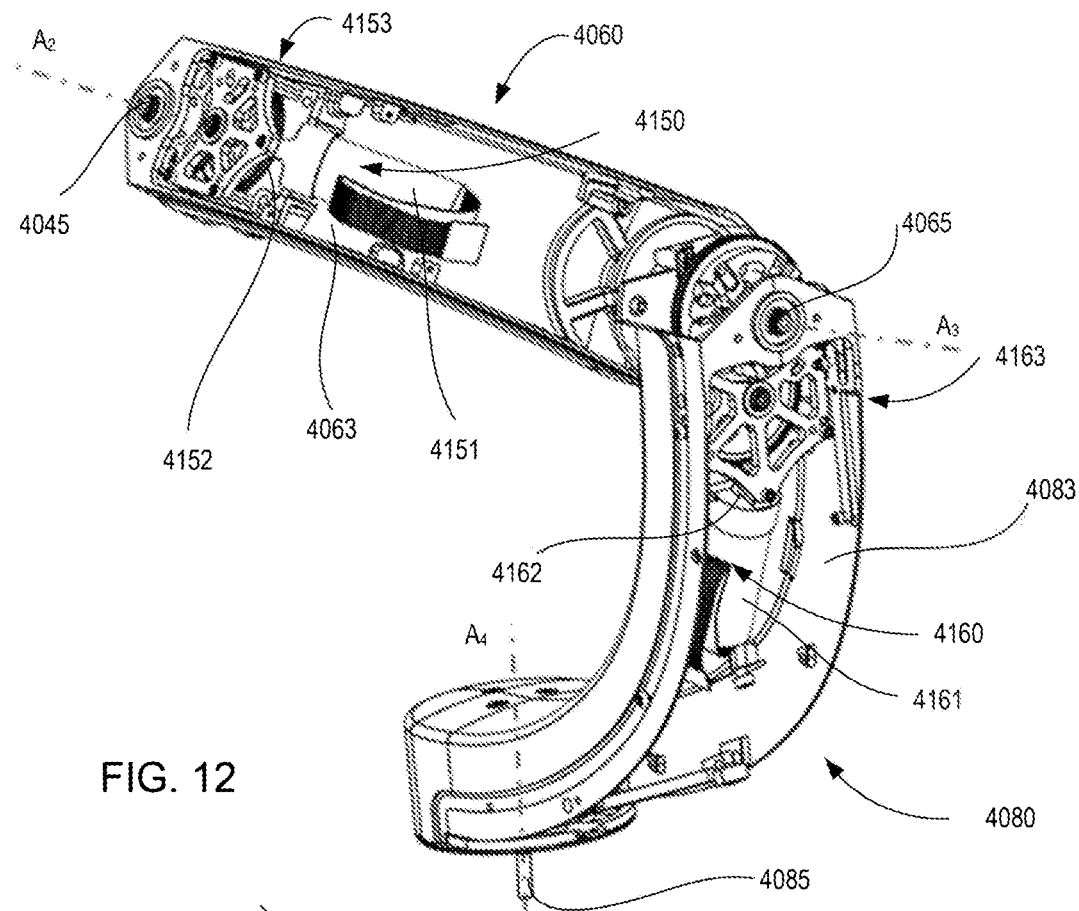
FIG. 12 is a rear perspective view of the input control device of FIG. 11 with housing covers hidden.

As shown in FIGS. 10-12, the first link 4040 includes a first end portion 4041, a second end portion 4042, and a first joint shaft 4045. The second link 4060 includes a first end portion 4061, a second end portion 4062, and a second joint shaft 4065. The third link 4080 includes a first end portion 4081, a second end portion 4082, and a third joint shaft 4085. The second end portion 4042 of the first link 4040 is rotatably coupled to the first end portion 4061 of the second link 4060 via the first joint shaft 4045. Similarly stated, the second end portion 4042 of the first link 4040 is coupled to the first end portion 4061 of the second link 4060 such that the first joint shaft extends within the second link 4060. The first joint shaft 4045 defines a second rotational axis $A_2$ (which may function as a yaw axis; the term yaw is arbitrary). The second rotational axis $A_2$ is perpendicular to the first rotational axis $A_1$. An intersection of the first rotational axis $A_1$ and the second rotational axis $A_2$ defines a gimbal center GC. In some embodiments, the distance from the gimbal center GC to the first end portion 4061 of the second link 4060 defines a first gimbal radius $R_{G1}$.

The second link 4060 further includes a second link housing 4063 extending between the first end portion 4061 and the second end portion 4062. The second end portion 4062 of the second link 4060 is rotatably coupled to the first end portion 4081 of the third link 4080 via the second joint shaft 4065. Similarly stated, the second link 4060 is coupled to the third link 4080 such that the second joint shaft 4065 extends within the third link 4080. The second joint shaft 4065 defines a third rotational axis $A_3$ (which may function as a pitch axis; the term pitch is arbitrary) and the third rotational axis $A_3$ is perpendicular to the second rotational axis $A_2$.

The third link 4080 further includes a third link housing 4083 extending between the first end portion 4081 and the second end portion 4082. The second end portion 4082 of the third link 4080 is rotatably coupled to the base portion 4130 via the third joint shaft 4085. Similarly stated, the third link 4080 is coupled to the base portion 4130 such that the third joint shaft 4085 extends within the base portion 4130 (see, e.g., FIGS. 7 and 12). The third joint shaft 4085 defines a fourth rotational axis $A_4$. The fourth rotational axis $A_4$ is perpendicular to the third rotational axis $A_3$. In some embodiments, the distance from the gimbal center GC to the first end portion 4081 of the third link 4080 defines a second gimbal radius $R_{G2}$.

Figure 8:
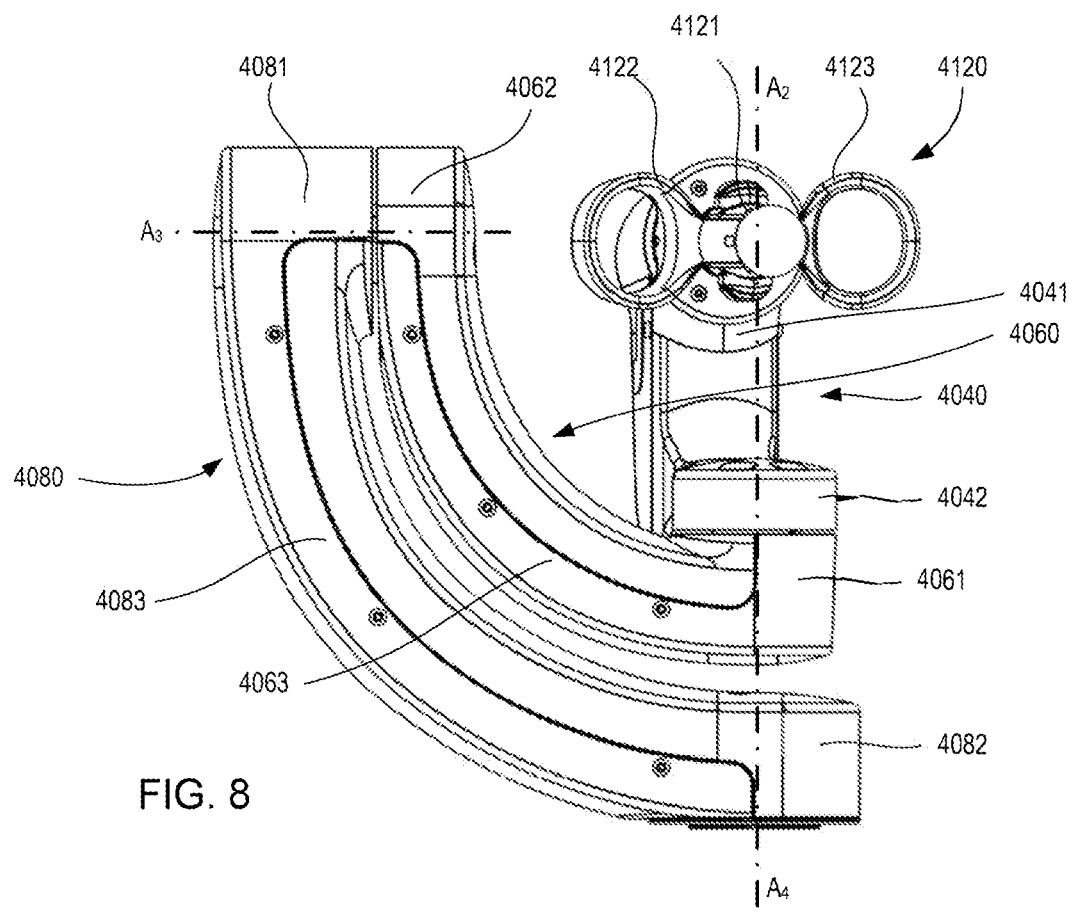
FIG. 8 is a front view of the input control device of FIG. 7.
Figure 9:
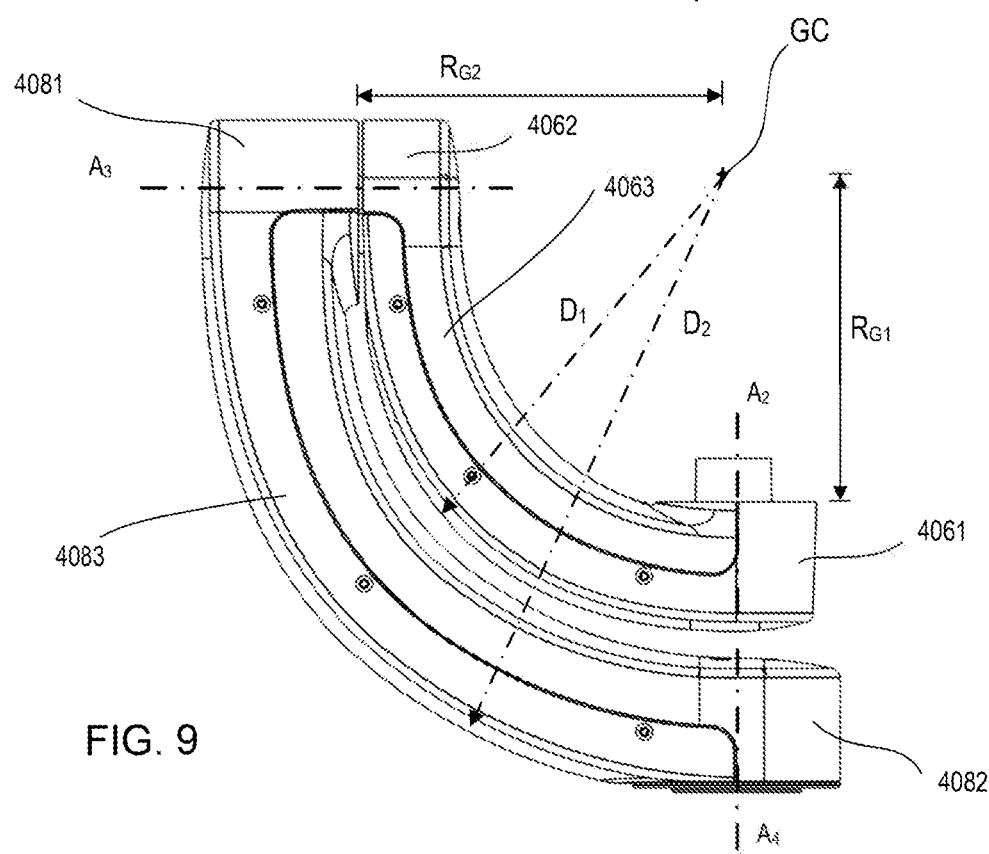
FIG. 9 is a front view of the input control device of FIG. 7 with the handle and first link hidden.

In some embodiments and in certain orientations, as shown in FIGS. 8-10, the second rotational axis $A_2$ and the fourth rotational axis $A_4$ are oriented co-linearly, however, it will be appreciated by one skilled in the art that the second rotational axis $A_2$ and the fourth rotational axis $A_4$ can be positioned to intersect one another when the second link 4060 is rotated about the third rotational axis $A_3$. For example, as shown in FIGS. 11 and 12, when the second link 4060 is rotated from an initial pose, the second rotational axis $A_2$ and the fourth rotational axis $A_4$ are no longer co-linear.

Figure 13:
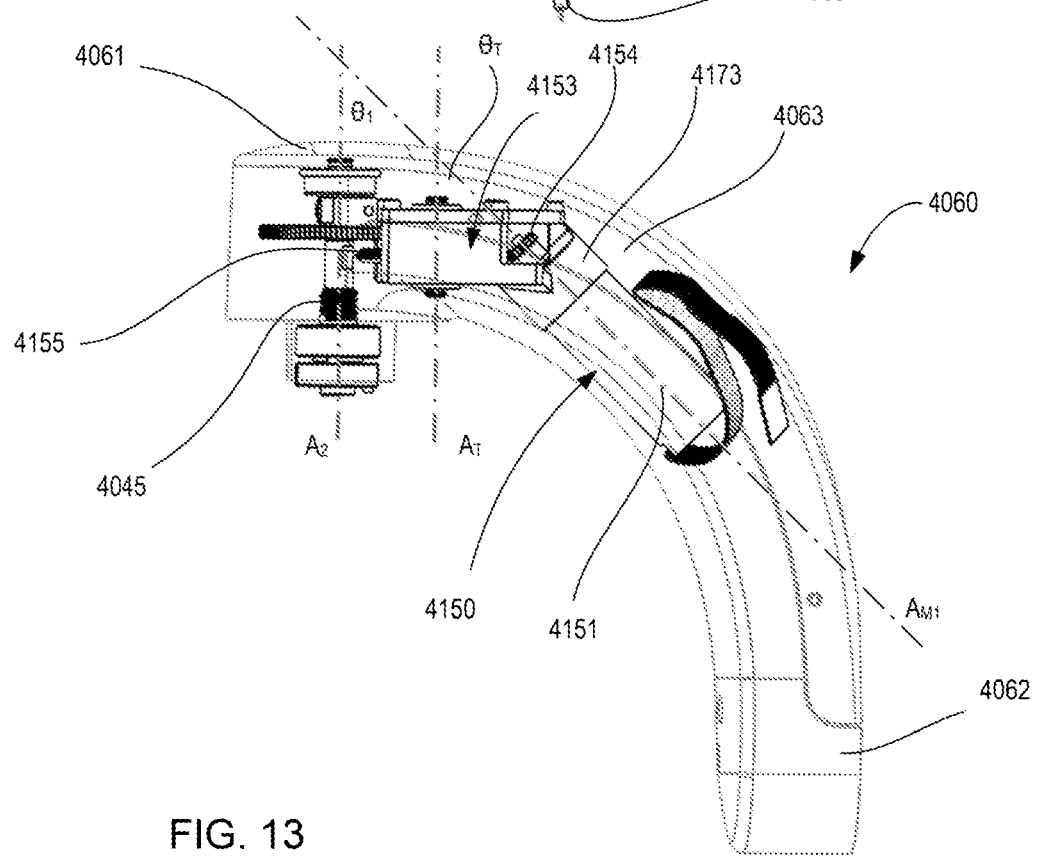
FIG. 13 is a side view of a gimbal link of the input control device of FIG. 7.
Figure 14:
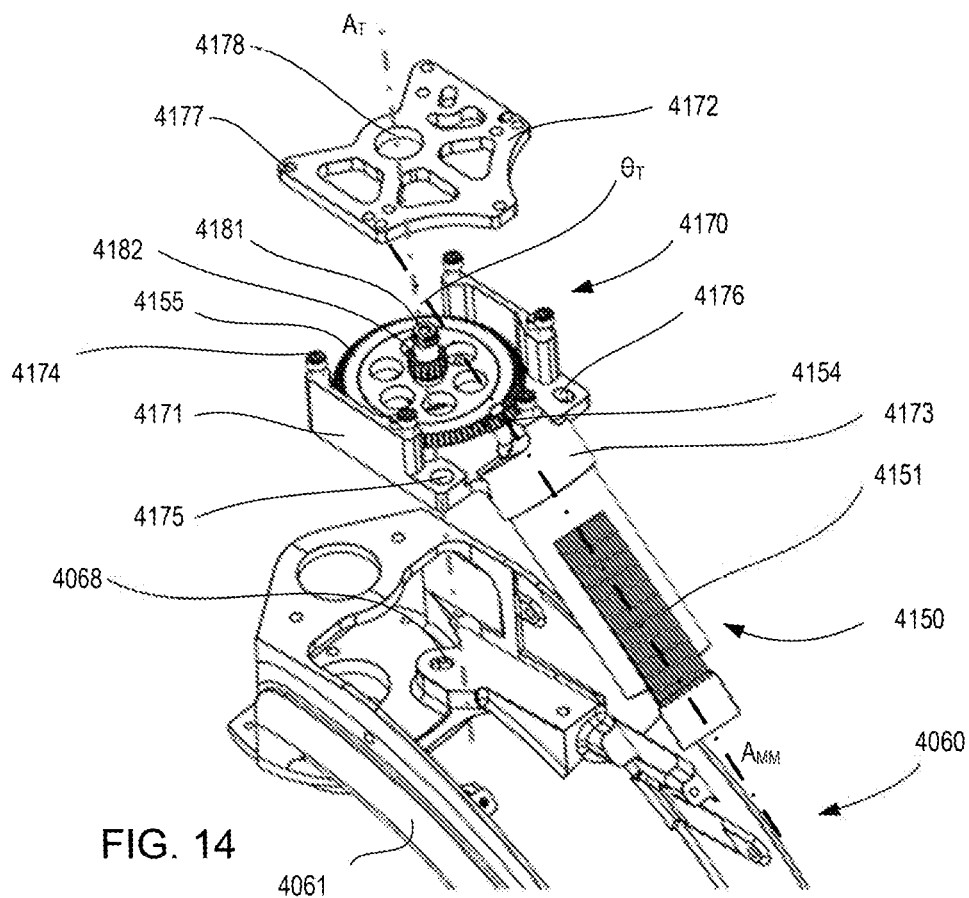
FIG. 14 is an exploded view of the gimbal link shown in FIG. 13.

As shown in FIGS. 12-14, the input control device 4000 includes a first actuator 4150. The first actuator 4150 is mounted in the second link 4060 within the second link housing 4063. The first actuator 4150 defines a first actuator axis $A_{M1}$. The first actuator 4150 is configured to exert a torque on or receive torque from the first joint shaft 4045. In this embodiment, the first actuator 4150 is a motor 4151 that includes a motor shaft 4152. The motor shaft 4152 is operatively coupled to the first joint shaft 4045. Additionally, the input control device 4000 includes a first actuator transmission 4153 mounted to the first end portion 4061 within the second link 4060. The first actuator transmission 4153 includes a driving gear 4154 and a driven gear 4155. The driving gear 4154 is fixed to the motor shaft 4152 and is configured to rotate together with the motor shaft 4152. The driven gear 4155 is configured to mesh with and be driven by the driving gear 4154, which in turn drives the first joint shaft 4045.

As shown in FIG. 12, the input control device 4000 includes a second actuator 4160. The second actuator 4160 is mounted in the third link 4080 within the third link housing 4083. The second actuator 4160 defines a second actuator axis (not shown). The second actuator 4160 is configured to exert a torque on or receive torque from the second joint shaft 4065. In this embodiment, the second actuator 4160 is a motor 4161 that includes a motor shaft 4162. The motor shaft 4162 is operatively coupled to the second joint shaft 4065. In some embodiments, the input control device 4000 includes a second actuator transmission 4163 mounted within the third link 4080. The second actuator transmission 4163 is mounted to the first end portion 4081 of the third link 4080. In some embodiments, as generally shown in FIG. 12, the second actuator transmission 4163 includes a driving gear and a driven gear, which can be arranged in a similar fashion as the first actuator transmission 4153. In some embodiments, the driving gear of the second actuator transmission 4163 can fixed to the motor shaft 4162 and configured to rotate together with the motor shaft 4162. The driven gear can be configured to mesh with and be driven by the driving gear, which in turn drives the second joint shaft 4065.

As shown for example in FIGS. 10 and 11, if the gravitation force $F_g$ acts downwardly in the diagram, it will be appreciated that as the second link 4060 is rotated relative to the third rotational axis $A_3$, the gravitational force $F_g$ will act on the handle portion 4121 and cause the first link 4040 to rotate about the second rotational axis $A_2$, for example. In other words, as the second link 4060 is moved out of the initial position (e.g., resting position) shown in FIG. 10, the gravitation force $F_g$ will act on one or more of the input handle 4120, the first link 4040, the second link 4060, and the third link 4080. Similar to the actuator 2150 described above, the first actuator 4150 and/or the second actuator 4160 can be operated to output torque to counteract the gravitational force $F_g$ applied on one or more of the first link 4040, the second link 4060, and the input handle 4120. For example, if the second link 4060 is rotated away from the resting position, the second actuator 4160 can be operated to output a torque to the second joint shaft 4065 to counteract the torque applied by the gravitational force $F_g$ on the first link 4040, the second link 4060, and the input handle 4120. As such, once the surgeon S has moved the handle portion 4121 to a particular position and orientation, the first actuator 4150 and/or the second actuator 4160 can be operated to hold the input control device 4000 at that last position and orientation placed by the surgeon S. The tool or instrument at the patient operating site (such as instrument 500 described herein) can also be held at a corresponding position and orientation until the surgeon S provides a new input. By offsetting the gravitational forces acting on the input control device 4000, the surgeon S is provided with a more natural and less restrictive way of controlling the instrument 500. As a result the input control devices described herein are operable to provide the surgeon S with a more fluid and weightless experience by isolating forces acting on the input control device 4000 if left unassisted. In doing so, the input control devices described herein may be able to provide improved fine motor control of the instrument 500 and/or reduce fatigue experienced by the surgeon S during operation. In some embodiments, the first actuator 4150 and/or the second actuator 4160 can be operated to output a torque to resist movement input by the surgeon S to simulate a condition observed at the tool and provide feedback to the surgeon S, as described herein.

As discussed above, the dynamics of master controllers can be improved by reducing the overall weight and moment of inertia at the input control devices. As shown in FIGS. 8-11, the link housing 4063 is curved and extends between the first end portion 4061 of the second end portion 4062. In some embodiments, the second link housing 4063 has a radius of curvature that is between about 0.5 to 1.5 times the first gimbal radius $R_{G1}$. In some embodiments, the second link housing 4063 has a radius of curvature that is between about 0.75 to 1.25 times the first gimbal radius $R_{G1}$. Similarly stated, a curvature of the second link housing 4063 need not follow a circular curvature. Instead, the curved portion can include a blended curve defined by a variable or multiple radii of curvature. In some embodiments, a first gimbal envelope is defined as a spherical volume centered about the gimbal center GC and characterized by a first envelope radius. In some embodiments, the first envelope radius is between about 0.75 to 1.25 times the first gimbal radius $R_{G1}$. For example, as shown in FIG. 9, a distance $D_1$ is about 1.25 times the first gimbal radius $R_{G1}$. A middle portion of the second link housing 4063 extends into or within the first gimbal envelope.

As shown, the third link housing 4083 is curved and extends between the first end portion 4081 of the second end portion 4082. In some embodiments, the third link housing 4083 has a radius of curvature that is between about 0.5 to 1.5 times the second gimbal radius $R_{G2}$. In some embodiments, the third link housing 4083 has a radius of curvature that is between about 0.75 to 1.25 times the second gimbal radius $R_{G2}$. Similarly stated, a curvature of the third link housing 4083 need not follow a circular curvature. Instead, the curved portion can include a blended curve defined by a variable or multiple radii of curvature. In some embodiments, a second gimbal envelope is defined as a spherical volume centered about the gimbal center GC and characterized by a second envelope radius. In some embodiments, the second envelope radius is between about 0.75 to 1.25 times the second gimbal radius $R_{G2}$. For example, as shown in FIG. 9, a distance $D_2$ is about 1.25 times the second gimbal radius $R_{G2}$. A middle portion of the third link housing 4083 extends into or within the second gimbal envelope.

As shown in FIGS. 12 and 13, the motor 4151 is mounted in the second link housing 4063. The first actuator axis $A_{M1}$ of motor 4151 and the second rotational axis $A_2$ define a first offset angle $\theta_1$. In some embodiments, the first offset angle $\theta_1$ is less than 90 degrees. In some embodiments, the first offset angle $\theta_1$ is less than 90 degrees. In some embodiments, the first offset angle $\theta_1$ is between about 20 degrees and 70 degrees. In some embodiment the first offset angle $\theta_1$ is between about 30 degrees and 60 degrees. Similarly, the motor 4161 is mounted in the third link housing 4083. Similar to the first actuator 4150, the second actuator 4160 and the third rotational axis $A_3$ define a second offset angle (not shown). In some embodiments, the second offset angle is less than 90 degrees. In some embodiments, the second offset angle is between about 20 degrees and 70 degrees. In some embodiment the second offset angle is between about 25 degrees and 65 degrees. In some embodiment the second offset angle is between about 30 degrees and 60 degrees.

Figures 15, 16:
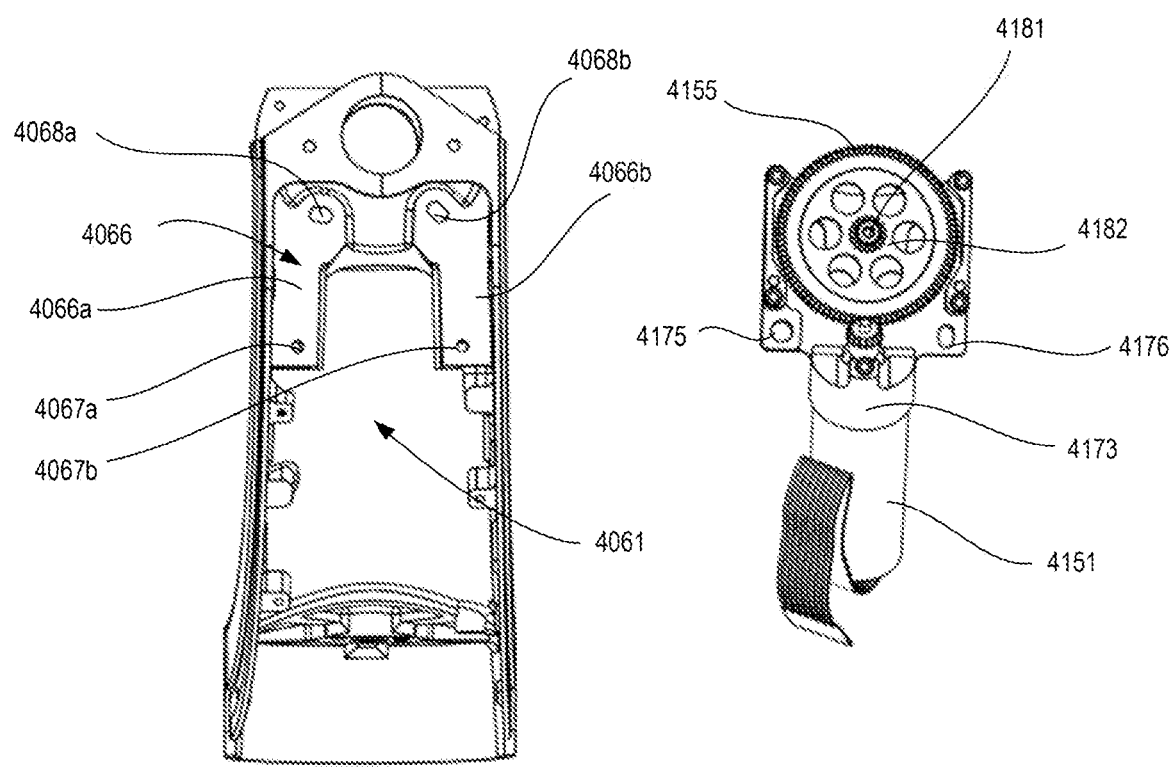
FIG. 15 is a top view of a portion of the gimbal link shown in FIG. 13.
FIG. 16 is a top view of a transmission housing of the gimbal link shown in FIG. 14.

As shown in FIGS. 14-16, the first actuator transmission 4153 includes a transmission housing 4170 to facilitate mounting of the first actuator transmission 4153 within the second link 4060 in a manner to provide the desired interface of the gears. The transmission housing 4170 includes a base portion 4171, a gear support portion 4172, and an actuator support portion 4173. The gear support portion 4172 is removably secured to the base portion 4171 via one or more fasteners (not shown). The base portion 4171 includes a shaft support (not shown) and the gear support portion 4172 includes a shaft support aperture 4178. The shaft support aperture 4178 is an aperture configured to rotatably support a gear shaft 4181. In other embodiments, the shaft support of the base portion 4171 and/or the gear support portion 4172 are configured to support a bearing or bushing member through which the gear shaft 4181 is supported on. The transmission housing 4170 includes a plurality of mounting holes 4174 and the gear support portion includes a plurality of mounting holes 4177 for securing the gear support portion to the transmission housing 4170 via one or more fasteners (not shown). For example, the fasteners can include but are not limited to screws, bolts, rivets, welds, and adhesives.

The base portion 4171 includes a first mounting element 4175, and a second mounting element 4176. The first mounting element 4175 and the second mounting element 4176 are through holes configured to receive a fastener to secure the transmission housing 4170 to the first end portion 4061 of the second link 4060. In some embodiments, the first mounting element 4175 is a circular through-hole and the second mounting element 4176 is an elongated through-hole. As shown in FIG. 15, the first end portion 4061 of the second link 4060 includes a mounting portion 4066. In some embodiments, the mounting portion 4066 has a first mounting surface 4066a and a second mounting surface 4066b. The first mounting surface 4066a includes a first fastener receiver 4067a and a second fastener receiver 4068a. The second mounting surface 4066b includes a first fastener receiver 4067b and a second fastener receiver 4068b.

In some embodiments, the first fastener receivers 4067a, 4067b are threaded screw holes. In some embodiments, the second fastener receivers 4068a, 4068b are elliptical through-holes. As shown generally in FIGS. 14 and 15, the base portion 4171 of the transmission housing 4170 is mounted onto the mounting portion 4066 by first aligning the first mounting element 4175, and a second mounting element 4176 over the first fastener receivers 4067a, 4067b. The transmission housing 4170 is secured to the mounting portion 4066 by inserting and securing a first fastener, such as a screw, downward through the first mounting element 4175 and into the first fastener receiver 4067a. A second fastener can be inserted and secured downward through the second mounting element 4176 and into the first fastener receiver 4067b. Because of the elongated shape of the elliptical through-hole in the second mounting element 4175, the transmission housing 4170 may be rotated about the first fastener receiver 4067a to adjust a position of the transmission housing 4170 relative to the first end portion 4061 of the second link 4060. By facilitating an adjustment to the position of the transmission housing 4170 and the gear shaft 4181 supported by the transmission housing 4170, a lash of the gears can be set and adjusted during manufacture or during servicing. Maintaining a desired lash between the gears of the transmission allows for improved efficiency and smooth operation.

As shown in FIGS. 13, 14, and 16, the motor 4151 is mounted to the actuator support portion 4173. The motor 4151 is axially and rotatably fixed to the actuator support portion 4173. In some embodiments, the motor 4151 is secured to the actuator support portion 4173 by adhesive. In some embodiments, the motor 4151 is secured to the actuator support portion 4173 using one or more fasteners.

As shown in FIGS. 13 and 14, the gear shaft 4181 defines a transmission axis $A_T$ and the motor 4151 defines a motor axis $A_{MM}$. The transmission axis $A_T$ and the motor axis $A_{MM}$ define a transmission offset angle $\theta_T$. In some embodiments, the transmission offset angle $\theta_T$ is less than 90 degrees. In some embodiments, the transmission offset angle $\theta_T$ is between about 20 degrees and 70 degrees. In some embodiment the transmission offset angle $\theta_T$ is between about 25 degrees and 65 degrees. In some embodiment the transmission offset angle $\theta_T$ is between about 30 degrees and 60 degrees. As shown in FIG. 13, the transmission axis $A_T$ and the second rotational axis $A_2$ are parallel, and the transmission offset angle $\theta_T$ is equal to the first offset angle $\theta_1$. In some embodiments, the gear shaft 4181 is configured to be adjusted along the transmission axis $A_T$ to adjust a lash between the driving gear 4154 and the driven gear 4155. Once the lash between the driving gear 4154 and the driven gear 4155 has been adjusted, a position of the gear shaft 4181 can be set relative to the base portion 4171 and a gear support portion using a combination of shims, spacers, clips, and/or fasteners. In some embodiments, the position of the gear shaft 4181 is set using a combination of shims and E-clips.

Figure 17:
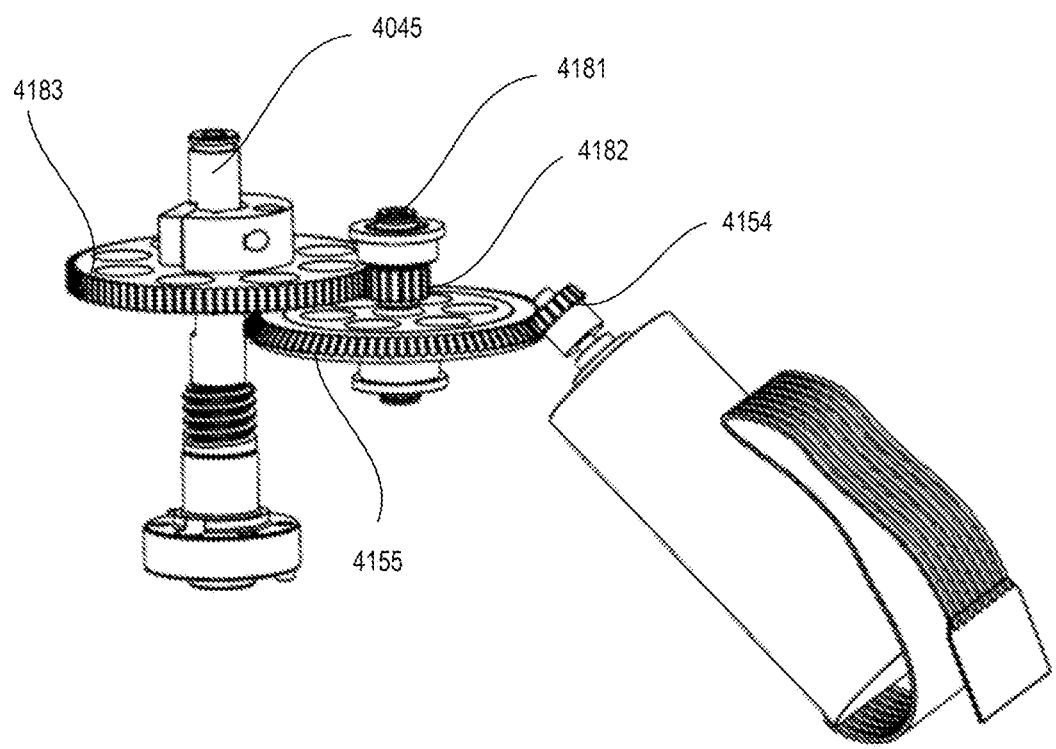
FIG. 17 is a perspective view of an actuator and transmission arrangement of the gimbal link shown in FIG. 13.

In some embodiments, as shown in FIG. 17, the first actuator transmission 4153 includes a reduction gear system with an input gear 4182 and an output gear 4183. The input gear 4182 is mounted to the gear shaft 4181 and configured to rotate at a same angular velocity as the driven gear 4155. The output gear 4183 is mounted to the first joint shaft 4045 and configured to mesh with and be driven by the input gear 4182. The reduction gear system is configured to decrease the load applied on the motor 4151 and increase the torque transferred to the first joint shaft 4045 via the output gear 4183.

In some embodiments, the input gear 4182 includes a first number of teeth, the output gear 4183 includes a second number of teeth, and the second number of teeth is greater than the first number of teeth. In some embodiments, a gear ratio of the output gear 4183 to the input gear 4182 is about 5:1 to about 7:1. In some embodiments, the gear ratio of the output gear 4183 to the input gear 4182 is set at about 6.9:1. As shown, the input gear 4182 and the output gear 4183 are spur gears. Although directly driven gears are shown, it will be appreciated that a pulley and belt system, gear and chain system, or other transmission systems can be employed.

As shown, the driving gear 4154 is configured to engage the driven gear 4155. In some embodiments, a gear ratio of the driven gear 4155 to the driving gear 4154 is about 5:1 to about 7:1. Thus, the effective gear ratio between the output gear 4183 and the driving gear 4154 is about 25:1 to 49:1. In some embodiments, the effective gear ratio between the output gear 4183 and the driving gear 4154 is set at about 48.2:1. The combination of directly driven gears provides an efficient transfer of power while maintaining a compact design compared with a planetary gear system or other related gear systems. The compact and lightweight gear system described herein reduces the overall mass of the input control device 4000 and enables the use of smaller actuators due to the torque conversion provided by the reduction gear system.

As described above, the transmission housing 4170 is operable to rotate about the first fastener receiver 4067a. In some embodiments, the transmission housing 4170 may be rotated and adjusted to set a gear lash between the input gear 4182 and the output gear 4183.

Although the transmission housing 4170 and associated components shown in FIGS. 14-17 are discussed in association with the first actuator 4150 and the second link 4060, a similar arrangement can also be employed for the second actuator 4160 and the third link 4080. In other embodiments, the transmission housing 4170 may be formed integrally with the second link 4060 or the third link 4080. For example, the housing 4170 may be monolithically formed on the first end portion 4061 of the second link 4060.

While various embodiments have been described above, it should be understood that they have been presented by way of example only, and not limitation. Where methods and/or schematics described above indicate certain events and/or flow patterns occurring in certain order, the ordering of certain events and/or operations may be modified. While the embodiments have been particularly shown and described, it will be understood that various changes in form and details may be made.

For example, any of the instruments described herein (and the components therein) are optionally parts of a surgical assembly that performs minimally invasive surgical procedures, and which can include a manipulator unit, a series of kinematic linkages, a series of cannulas, or the like. Thus, any of the instruments described herein can be used in any suitable surgical system, such as the MIRS system 1000 shown and described above.

Although various embodiments have been described as having particular features and/or combinations of components, other embodiments are possible having a combination of any features and/or components from any of embodiments as discussed above. For example, in some embodiments, the second actuator transmission 4163 may include the same components as the first actuator transmission 4153. In some embodiments, the input control device 4000 includes only one actuator and transmission (e.g., only the first actuator 4150 and the first actuator transmission 4153, or only the second actuator 4160 and the second actuator transmission 4163). Aspects have been described in the general context of medical devices, and more specifically surgical instruments, but inventive aspects are not necessarily limited to use in medical devices.

What is claimed is:

1. A control input assembly, comprising:
   an input handle, a first link, a second link, and an actuator;
   the input handle being rotatable about a first rotational axis and comprising a handle input shaft;
   the first link comprising a first link first end portion, a first link second end portion opposite the first link first end portion, and a joint shaft rotatable about a second rotational axis perpendicular to the first rotational axis and coupled to the first link second end portion, the first link first end portion being coupled to the input handle such that the handle input shaft extends within the first link;
   the second link comprising a second link first end portion, a second link second end portion opposite the second link first end portion and coupled to the first link second end portion via the joint shaft of the first link, and a second link housing extending from the second link first end portion to the second link second end portion; and
   the actuator being mounted within the second link housing and coupled to exert a torque on the joint shaft of the first link about an actuator axis such that the actuator axis and the second rotational axis of the joint shaft define an offset angle larger than 0 degrees and less than 90 degrees.

2. The control input assembly of claim 1, wherein:
   the offset angle is less than about 60 degrees.

3. The control input assembly of claim 1, wherein:
   a gimbal center point is defined at an intersection of the first rotational axis and the second rotational axis;
   a gimbal radius is defined by a distance between the gimbal center point and the second link first end portion;
   at least a portion of the second link housing is curved; and
   the portion of the second link housing has a radius of curvature between about 0.5 to 1.5 times the gimbal radius.

4. The control input assembly of claim 1, wherein:
   a gimbal center point is defined at an intersection of the first rotational axis and the second rotational axis;
   a gimbal radius is defined by a distance between the gimbal center point and the second link first end portion;
   a gimbal envelope is defined as a spherical volume surrounding the gimbal center point and characterized by the gimbal radius; and the second link housing comprises a curved portion within the gimbal envelope.

5. The control input assembly of claim 1, wherein:
a gimbal center point is defined at an intersection of the first rotational axis and the second rotational axis;
a gimbal radius is defined by a distance between the gimbal center point and the second link first end portion;
the second link housing defines an offset gimbal surface extending at least partially along the actuator axis; and
the offset gimbal surface intersects an arc defined by the gimbal radius.

6. The control input assembly of claim 1, wherein:
the actuator is a motor; and
the motor comprises a motor shaft extending along the actuator axis and operatively coupled the joint shaft.

7. The control input assembly of claim 6, wherein:
the control input assembly comprises an actuator transmission mounted within the second link housing;
the actuator transmission comprises one or more gears; and
the motor shaft is operatively coupled to the joint shaft via the one or more gears of the actuator transmission.

8. The control input assembly of claim 1, wherein:
a gimbal center point is defined at an intersection of the first rotational axis and the second rotational axis;
a gimbal radius is defined by a distance between the gimbal center point and the second link first end portion;
the actuator is a first actuator, the actuator axis is a first actuator axis, the joint shaft is a first joint shaft, and the offset angle is a first offset angle;
the second link comprises a second joint shaft rotatable about a third rotational axis and coupled to the second link second end portion;
the control input assembly further comprises a third link and a second actuator;
the third link comprises a third link first end portion coupled to the second link second end portion via the second joint shaft of the second link, a third link second end portion opposite the third link first end portion, and a third link housing extending from the third link first end portion to the third link second end portion; and
the second actuator is mounted within the third link housing and coupled to exert a torque on the second joint shaft of the second link about a second actuator axis such that the second actuator axis and the third rotational axis of the second joint shaft define a second offset angle larger than 0 degrees and less than 90 degrees.

9. The control input assembly of claim 8, wherein:
the gimbal radius is a first gimbal radius;
a second gimbal radius is defined by a distance between the gimbal center point and the third link first end portion;
the second link housing comprises a curved portion having a radius of curvature between about 0.5 to 1.5 times the first gimbal radius; and
the third link comprises a curved portion having a radius of curvature between about 0.5 to 1.5 times the second gimbal radius.

10. The control input assembly of claim 1 embodied in a control unit of a telesurgical system.

11. A control input assembly, comprising:
an input handle, a first link, a second link, and an actuator;
the input handle comprising a handle input shaft rotatable about a first rotational axis;
the first link comprising a first link first end portion, a first link second end portion opposite the first link first end portion, and a joint shaft rotatable about a second rotational axis perpendicular to the first rotational axis, the first link first end portion being coupled to the input handle such that the handle input shaft extends within the first link, and the first link second end portion being coupled to the joint shaft;
the second link comprising a second link first end portion, a second link second end portion, and a second link middle portion between the second link first end portion and the second link second end portion, the second link first end portion being coupled to the first link second end portion via the joint shaft of the first link;
an intersection of the first rotational axis and the second rotational axis defining a gimbal center point;
a gimbal radius being defined as a distance between the gimbal center point and the second link first end portion;
a gimbal envelop being defined as a spherical volume surrounding the gimbal center point and characterized by the gimbal radius;
the second link middle portion being curvilinear and entirely within the gimbal envelop; and
the actuator being mounted within the second link and operatively coupled to exert a torque on the joint shaft of the first link.

12. The control input assembly of claim 11, wherein:
the actuator is an electric motor; and
the electric motor comprises a motor shaft operatively coupled to the joint shaft of the first link.

13. The control input assembly of claim 12, wherein:
the control input assembly further comprises an actuator transmission mounted within a second link housing;
the actuator transmission comprises one or more gears; and
the motor shaft is operatively coupled to the joint shaft of the first link via the one or more gears of the actuator transmission.

14. The control input assembly of claim 13, wherein:
the one or more gears comprise a driving gear and a driven gear;
the driving gear comprises a first number of gear teeth;
the driven gear comprises a second number of gear teeth; and
the second number of gear teeth is larger than the first number of gear teeth.

15. The control input assembly of claim 13, wherein:
the actuator transmission comprises a transmission shaft;
the one or more gears comprise a first bevel gear, a second bevel gear, a spur gear, and an output gear;
the motor shaft comprises an end portion, and the first bevel gear is mounted to the end portion of the motor shaft;
the first bevel gear is coupled to drive the second bevel gear;
the second bevel gear and the spur gear are coupled to the transmission shaft such that the second bevel gear, the spur gear, and the transmission shaft rotate at a common rotational speed; and
the spur gear is coupled to drive the output gear, the output gear is coupled to the joint shaft such that the spur gear drives rotation of the join shaft.

16. The control input assembly of claim 13, wherein:
the actuator transmission comprises a transmission shaft;
the motor shaft of the electric motor is rotatable about an actuator axis;

the transmission shaft is rotatable about a transmission axis; and the transmission axis and the actuator axis define an offset angle between about 30 degrees and 60 degrees.

17. The control input assembly of claim 11, wherein:

a radius of curvature of the second link middle portion is about 0.75 to 1.25 times the gimbal radius.

18. A control input assembly, comprising:

an input handle, a first link, a second link, a third link, a first actuator, and a second actuator;

the input handle comprising a handle input shaft rotatable about a first rotational axis;

the first link comprising a first link first end portion, a first link second end portion opposite the first link first end portion, and a first joint shaft rotatable about a second rotational axis perpendicular to the first rotational axis, the first link first end portion being coupled to the input handle such that the handle input shaft extends within the first link, and the first link second end portion being coupled to the first joint shaft;

the second link comprising a second link first end portion, a second link second end portion opposite the second link first end portion, a second link middle portion extending between the second link first end portion and the second link second end portion, and a second joint shaft rotatable about a third rotational axis perpendicular to the second rotational axis, the second link first end portion being coupled to the first link second end portion via the first joint shaft of the first link, the second link middle portion extending in a first direction, and the first direction including a component parallel to the first rotational axis and a component parallel to the second rotational axis;

the first actuator being coupled to the second link and operably coupled to exert a torque on the first joint shaft of the first link, at least a portion of the first actuator extending within the second link middle portion;

the third link comprising a third link first end portion, a third link second end portion, and a third link middle portion extending between the third link first end portion and the third link second end portion, the third link first end portion being coupled to the second link second end portion via the second joint shaft of the second link, the third link middle portion extending in a second direction, and the second direction including a component parallel to the second rotational axis and a component parallel to the third rotational axis; and the second actuator being coupled to the third link and operably coupled to exert a torque on the second joint shaft of the second link, at least a portion of the second actuator extending within the second link middle portion, the first actuator drives rotation about a first actuator axis;

the second actuator drives rotation about a second actuator axis;

the first actuator axis and the second rotational axis define a first offset angle larger than 0 degrees and less than 90 degrees; and the second actuator axis and the third rotational axis define a second offset angle larger than 0 degrees and less than 90 degrees.

19. The control input assembly of claim 18, wherein:

the first offset angle is between about 25 degrees and 65 degrees; and the second offset angle is between about 15 degrees and 75 degrees.

* * * * *